US012579317B2

(12) United States Patent
Peng et al.

(10) Patent No.: US 12,579,317 B2
(45) Date of Patent: Mar. 17, 2026

(54) APPLICATION INFORMATION VERIFICATION METHOD, PACKET PROCESSING METHOD, AND APPARATUSES THEREOF

(71) Applicant: Huawei Technologies Co., Ltd., Shenzhen (CN)

(72) Inventors: Shuping Peng, Beijing (CN); Jianwei Mao, Beijing (CN); Liang Xia, Shenzhen (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/064,758

(22) Filed: Dec. 12, 2022

(65) Prior Publication Data

US 2023/0113138 A1    Apr. 13, 2023

Related U.S. Application Data

(63) Continuation of application No. PCT/CN2021/085800, filed on Apr. 7, 2021.

(30) Foreign Application Priority Data

Jun. 12, 2020    (CN) .......................... 202010538369.3
Jul. 13, 2020    (CN) .......................... 202010669854.4
Jul. 13, 2020    (CN) .......................... 202010670997.7

(51) Int. Cl.
    *G06F 21/64*         (2013.01)
    *G06F 11/3668*       (2025.01)
         (Continued)

(52) U.S. Cl.
    CPC .......... *G06F 21/64* (2013.01); *G06F 11/3684* (2013.01); *G06F 21/554* (2013.01);
         (Continued)

(58) Field of Classification Search
    CPC ... G06F 11/3684; H04L 67/1095; H04L 63/02
    See application file for complete search history.

(56) References Cited

U.S. PATENT DOCUMENTS 7,891,012 B1 *    2/2011    Kiel ...................... G06F 21/554
                                                    713/176
9,146,829 B1 *    9/2015    Allen .................. G06F 11/3684
         (Continued)

FOREIGN PATENT DOCUMENTS

CN      103428204 A      12/2013
CN      104217327 A      12/2014
         (Continued)

OTHER PUBLICATIONS

J. Gross, Ed. et al, Geneve: Generic Network Virtualization Encapsulation, draft-ietf-nvo3-geneve-16, Mar. 7, 2020, 73 pages.
         (Continued)

*Primary Examiner* — Barbara B Anyan
(74) *Attorney, Agent, or Firm* — Conley Rose, P.C.

(57) ABSTRACT

An application information verification method is performed by a first apparatus. The first apparatus receives a first packet including application information. The first apparatus verifies integrity of the application information in the first packet. In embodiments of the present disclosure, the first packet includes the application information and first verification information, and the first verification information is for verifying the integrity of the application information. Therefore, after receiving the first packet, the first apparatus may verify the integrity of the application information based on the first verification information.

13 Claims, 10 Drawing Sheets

(51) Int. Cl.

| | |
|---|---|
| *G06F 21/55* | (2013.01) |
| *H04L 9/40* | (2022.01) |
| *H04L 47/70* | (2022.01) |
| *H04L 67/1095* | (2022.01) |
| *H04L 69/167* | (2022.01) |

(52) U.S. Cl.

CPC .............. *H04L 47/70* (2013.01); *H04L 63/02* (2013.01); *H04L 67/1095* (2013.01); *H04L 69/167* (2013.01)

(56) References Cited

U.S. PATENT DOCUMENTS

| | | | | |
|---|---|---|---|---|
| 2008/0052509 | A1* | 2/2008 | Ahmed ................... | H04L 63/02 713/156 |
| 2009/0150510 | A1* | 6/2009 | Kovacs ............... | H04L 67/1095 709/213 |
| 2012/0236864 | A1* | 9/2012 | Zheng ................... | H04L 69/167 370/392 |
| 2014/0208394 | A1 | 7/2014 | Goodwin | |
| 2015/0262179 | A1* | 9/2015 | Zhang ................... | G06Q 20/405 705/42 |
| 2017/0141926 | A1 | 5/2017 | Xu et al. | |
| 2018/0288068 | A1 | 10/2018 | Poliashenko | |

FOREIGN PATENT DOCUMENTS

| | | | |
|---|---|---|---|
| CN | 105338434 | A | 2/2016 |
| CN | 105591754 | A | 5/2016 |
| CN | 105721413 | A | 6/2016 |
| CN | 109040063 | A | 12/2018 |
| CN | 109309689 | A | 2/2019 |
| CN | 110768884 | A | 2/2020 |
| JP | 2015089013 | A | 5/2015 |

OTHER PUBLICATIONS

Z. Li et al, Application-aware IPv6 Networking (APN6) Encapsulation, draft-li-6man-app-aware-ipv6-network-03, Feb. 22, 2021, 33 pages.

Z. Li et al, Application-aware Networking (APN) Framework, draft-li-apn-framework-07, Apr. 3, 2023, 22 pages.

RFC 791, Internet Protocol Darpa Internet Program Protocol Specification, Sep. 1981, 51 pages.

RFC 2104, H. Krawczyk et al, HMAC: Keyed-Hashing for Message Authentication, Network Working Group, Feb. 1997, 11 pages.

RFC 2784, D. Farinacci et al, Generic Routing Encapsulation (GRE), Network Working Group, Mar. 2000, 9 pages.

RFC 2890, G. Dommety et al, Key and Sequence No. Extensions to GRE, Network Working Group, Sep. 2000, 7 pages.

RFC 7348, M. Mahalingam et al, Virtual extensible Local Area Network (VXLAN): A Framework for Overlaying Virtualized Layer 2 Networks over Layer 3 Networks, Independent Submission, Aug. 2014, 22 pages.

RFC 7637, P. Garg, Ed. et al, NVGRE: Network Virtualization Using Generic Routing Encapsulation, Independent Submission, Sep. 2015, 17 pages.

RFC 8200, S. Deering et al, Internet Protocol, Version 6 (IPv6) Specification, Internet Engineering Task Force (IETF), Jul. 2017, 42 pages.

Li Z et al, Application-aware IPv6 Networking, draft-li-6man-app-aware-ipv6-network-01, Apr. 20, 2020, XP015139198, total 14 pages.

* cited by examiner

| New IP header | ESP header | IP header | IP extension header | TCP header | Data | ESP tailer | ESP authentication data |
|---|---|---|---|---|---|---|---|

← ———————— ESP verification scope ————————→

FIG. 4d

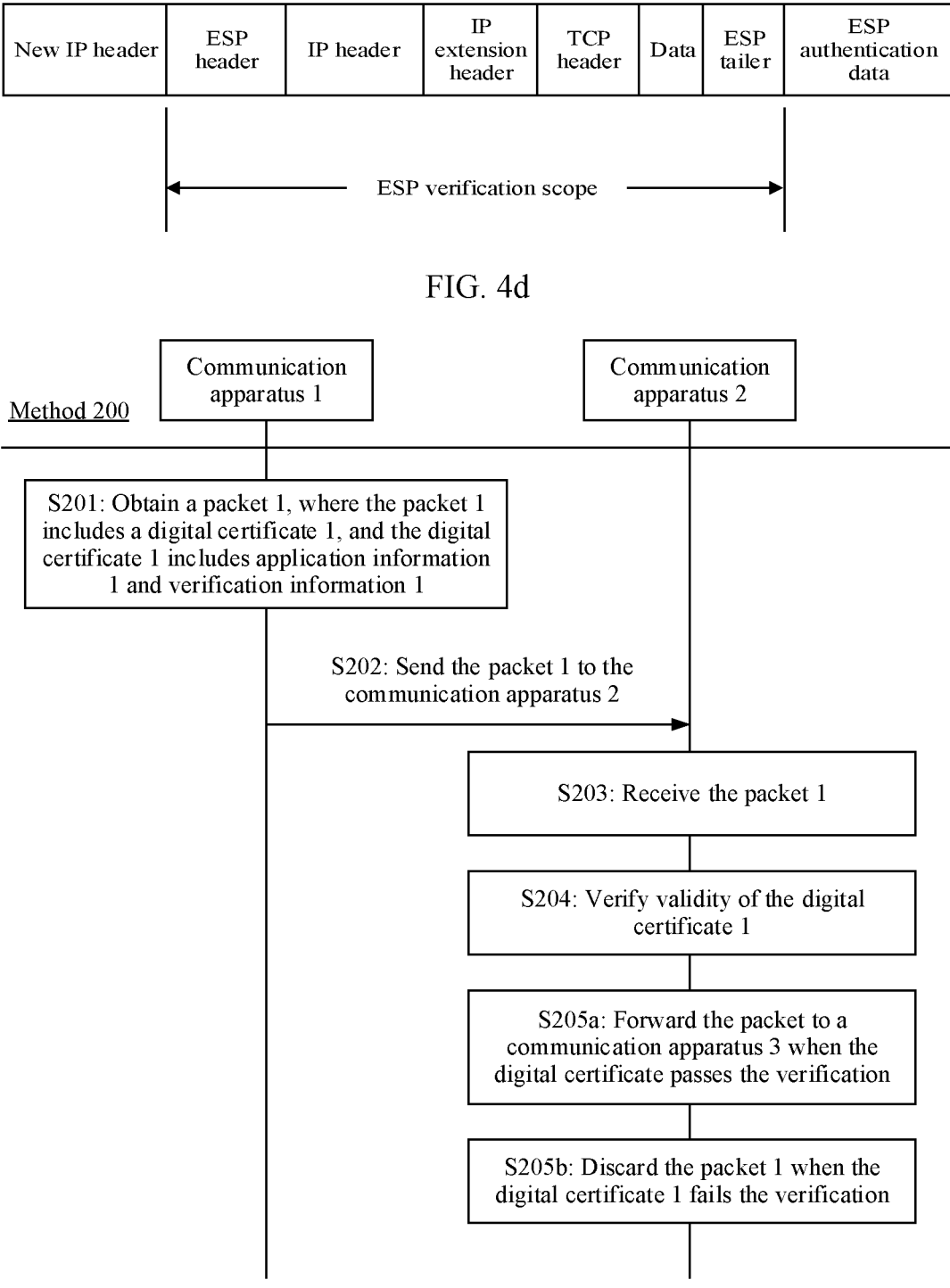

Method 200

Communication apparatus 1

Communication apparatus 2

S201: Obtain a packet 1, where the packet 1 includes a digital certificate 1, and the digital certificate 1 includes application information 1 and verification information 1

S202: Send the packet 1 to the communication apparatus 2

S203: Receive the packet 1

S204: Verify validity of the digital certificate 1

S205a: Forward the packet to a communication apparatus 3 when the digital certificate passes the verification S205b: Discard the packet 1 when the digital certificate 1 fails the verification

FIG. 5

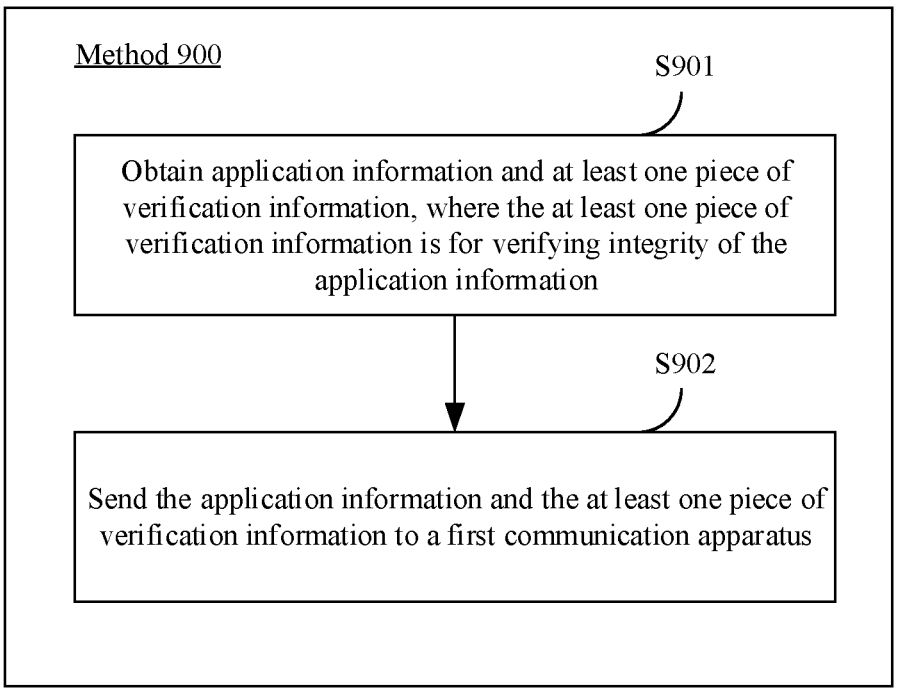

Method 900                                    S901

Obtain application information and at least one piece of
verification information, where the at least one piece of
verification information is for verifying integrity of the
application information

S902

Send the application information and the at least one piece of
verification information to a first communication apparatus

Communication apparatus 1301                              1302

Transceiver unit              Processing unit

APPLICATION INFORMATION VERIFICATION METHOD, PACKET PROCESSING METHOD, AND APPARATUSES THEREOF

CROSS-REFERENCE TO RELATED APPLICATIONS

This application is a continuation of International Patent Application No. PCT/CN2021/085800, filed on Apr. 7, 2021, which claims priorities to Chinese Patent Application No. 202010538369.3, filed on Jun. 12, 2020, Chinese Patent Application No. 202010670997.7, filed on Jul. 13, 2020, and Chinese Patent Application No. 202010669854.4, filed on Jul. 13, 2020. All of the aforementioned patent applications are hereby incorporated by reference in their entireties.

TECHNICAL FIELD

The present disclosure relates to the communication field, and in particular, to an application information verification method, a packet processing method, and apparatuses thereof.

BACKGROUND

In some networks, for example, in Application-Aware Internet Protocol version 6 Networking (APN6) networks, application information may be carried in a service packet, so that a network device in the network can determine an application requirement based on the application information after the service packet enters the network, to allocate a corresponding network resource to an application.

At present, improper use of the application information may lead to improper use of the network resource.

SUMMARY

Embodiments of the present disclosure provide an application information verification method, a packet processing method, and apparatuses thereof, to avoid improper use of a network resource caused by improper use of application information.

According to a first aspect, an embodiment of the present disclosure provides an application information verification method. The method may be performed by a first communication apparatus. After receiving a first packet including application information, the first communication apparatus may verify integrity of the application information in the first packet. In this embodiment of the present disclosure, the first packet includes the application information and first verification information, and the first verification information is for verifying the integrity of the application information. Therefore, after receiving the first packet, the first communication apparatus may verify the integrity of the application information based on the first verification information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, during specific implementation in which the first communication apparatus verifies the integrity of the application information based on the first verification information, the first communication apparatus may obtain second verification information based on a target field in the first packet, where the target field includes the application information. After obtaining the second verification information, the first communication apparatus performs matching verification on the second verification information and the first verification information. The matching verification performed on the second verification information and the first verification information may be, for example, comparison of the first verification information and the second verification information. If the first verification information and the second verification information are the same, the matching verification succeeds; or if the first verification information and the second verification information are different, the matching verification fails. In this way, the integrity of the application information may be verified.

In an implementation, during specific implementation in which the first communication apparatus verifies the integrity of the application information based on the first verification information, the first communication apparatus may verify, for example, the integrity of the application information based on a first verification method and the first verification information.

In an implementation, the first verification method is keyed-hash message authentication code (HMAC) verification.

In an implementation, when the first verification method is the HMAC verification, the first verification information included in the first packet may be first HMAC verification information. The first HMAC verification information may be obtained by performing HMAC calculation on the target field in the first packet. In this case, during specific implementation in which the first communication apparatus verifies the integrity of the application information based on a first verification method and the first verification information, the first communication apparatus may perform HMAC calculation on the target field in the first packet to obtain second HMAC verification information, and then perform matching verification on the first HMAC verification information and the second HMAC verification information, to verify the integrity of the application information.

In an implementation, the first verification method is digital signature verification.

In an implementation, when the first verification method is the digital signature-based verification, the first verification information is a digital signature obtained by signing the target field in the first packet through a first private key and first hash calculation. In this case, during specific implementation in which the first communication apparatus verifies the integrity of the application information based on a first verification method and the first verification information, the first communication apparatus may decrypt the digital signature by using a first public key to obtain a first plaintext; and perform second hash calculation on the target field to obtain a second plaintext, where the first hash calculation and the second hash calculation use a same hash algorithm; and then the first communication apparatus performs matching verification on the first plaintext and the second plaintext.

In an implementation, the first packet further includes a digital certificate, and the digital certificate includes the first public key. In this embodiment of the present disclosure, the digital certificate may be a digital certificate of a sending device of the first packet, and the digital certificate may be considered as an identity certificate of the sending device of the first packet. When the first public key is carried in the digital certificate, validity of the first public key can be ensured.

In an implementation, the digital certificate further includes a decryption algorithm for decrypting the digital signature, and/or the hash algorithm. When the decryption algorithm for decrypting the digital signature is carried in the digital signature, validity of the decryption algorithm can be ensured. When the hash algorithm is carried in the digital signature, validity of the hash algorithm can be ensured.

In an implementation, the method further includes verifying validity of the digital certificate. It may be understood that validity of the sending device of the first packet may be verified by verifying the validity of the digital certificate. Correspondingly, if the digital certificate further carries other information, for example, carries the first public key or the decryption algorithm for decrypting the digital signature, and/or the hash algorithm, validity of the other information carried in the digital certificate may also be verified.

In an implementation, the first packet includes a digital certificate, and the application information and the first verification information are carried in the digital certificate.

In an implementation, when the application information and the first verification information are carried in the digital certificate, during specific implementation in which the first communication apparatus verifies the integrity of the application information based on the first verification information, the first communication apparatus may verify validity of the digital certificate.

In an implementation, the first verification method is Internet Protocol Security (IPsec)-based integrity verification. The IPsec-based integrity verification includes authentication header (AH)-based integrity verification and encapsulating security payload (ESP)-based integrity verification. In this embodiment of the present disclosure, the AH-based integrity verification may also be referred to as AH verification, and the AH-based integrity verification may also be referred to as ESP verification.

In an implementation, when the first verification method is the AH verification, the first verification information is first AH verification information, and the first AH verification information may be obtained by performing calculation on the target field in the first packet by using an AH verification algorithm. In this case, during specific implementation in which the first communication apparatus verifies the integrity of the application information based on a first verification method and the first verification information, the first communication apparatus may perform calculation on the target field in the first packet by using the AH verification algorithm, to obtain second AH verification information; and perform matching verification on the first AH verification information and the second AH verification information.

In an implementation, when the first verification method is the ESP verification, the first verification information is first ESP verification information, and the first ESP verification information may be obtained by performing calculation on the target field in the first packet by using an ESP verification algorithm. In this case, during specific implementation in which the first communication apparatus verifies the integrity of the application information based on a first verification method and the first verification information, the first communication apparatus may perform calculation on the target field in the first packet by using the ESP verification algorithm, to obtain second ESP verification information; and perform matching verification on the first ESP verification information and the second ESP verification information.

In an implementation, the first communication apparatus is a network device. The network device verifies the integrity of the application information, so that whether application information is embezzled can be determined, thereby ensuring that a network resource corresponding to the application information is not embezzled.

In an implementation, the first communication apparatus includes an access (ACC) device, a customer-premises equipment (CPE) device, a residential gateway (RG), a data center server access leaf device, a data center gateway (DC GW), an autonomous system boundary router (ASBR), a base station, a user plane function (UPF) device, a broadband network gateway (BNG), or a provider edge (PE) device.

In an implementation, after the first communication apparatus verifies the integrity of the application information, if the application information passes the verification, it indicates that the application information in the first packet is valid. Therefore, the first communication apparatus may forward the first packet. In an example, the first communication apparatus may determine a corresponding network resource based on the application information and forward the first packet by using the determined network resource.

In an implementation, after the first communication apparatus verifies the integrity of the application information, if the application information fails the verification, it indicates that the application information in the first packet is invalid. Therefore, the first communication apparatus may discard the first packet. This avoids embezzlement of the network resource corresponding to the application information.

According to a second aspect, an embodiment of the present disclosure provides a packet processing method. The method may be performed by a second communication apparatus. The second communication apparatus may generate a first packet. In addition to including application information, the first packet further includes first verification information for verifying integrity of the application information. After generating the first packet, the second communication apparatus may send the first packet to a first communication apparatus, so that the first communication apparatus verifies the integrity of the application information based on the first verification information. In this way, after receiving the first packet, the first communication apparatus may verify the integrity of the application information based on the first verification information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, the first verification information is obtained based on a target field in the first packet, and the target field includes the application information. In an example, the second communication apparatus may obtain a target field, and then obtain the first verification information based on the target field. Further, the second communication apparatus encapsulates the first verification information into the first packet, to obtain the first packet including the application information and the first verification information.

In an implementation, the first verification information is obtained by performing calculation on the target field in the first packet by using a first verification method, and the target field includes the application information. In an example, the second communication apparatus may obtain a target field, and then perform calculation on the target field in the first packet by using a first verification method, to obtain the first verification information. Further, the second communication apparatus encapsulates the first verification information into the first packet, to obtain the first packet including the application information and the first verification information.

In an implementation, the first verification method is HMAC verification.

In an implementation, the first verification information includes first HMAC verification information.

In an implementation, the first verification method is digital signature verification.

In an implementation, the first verification information is a digital signature obtained by signing the target field by using a first private key.

In an implementation, the first verification information is an encrypted digest in a digital certificate, and the digital certificate further includes the application information.

In an implementation, when the first verification method is the HMAC verification, or the first verification method is the digital signature verification, or the first verification information is the encrypted digest in the digital certificate, the first verification information is sent by a control management device to the second communication apparatus. In an example, the second communication apparatus may send the application information to the control management device, and the control management device performs calculation on the application information to obtain the first verification information. Further, the control management device sends the calculated first verification information to the second communication apparatus.

In an implementation, the first verification method is IPsec-based integrity verification.

In an implementation, the first verification information is first AH verification information. In this case, the first AH verification information may be obtained by the second communication apparatus by performing calculation on the target field in the first packet by using an AH verification algorithm.

In an implementation, the first verification information is first ESP verification information. In this case, the first ESP authentication information may be obtained by the second communication apparatus by performing calculation on the target field in the first packet by using an ESP verification algorithm.

In an implementation, the second communication apparatus is a server or user equipment.

In an implementation, the user equipment includes an internet of things (IoT) device or a terminal device.

In the first aspect and the second aspect:

The application information and the first verification information may be carried in a packet header of the first packet.

In an implementation, the first packet is an Internet Protocol version 6 (IPv6) packet.

In an implementation, when the first packet is the IPV6 packet, the application information is carried in an IPV6 extension header.

In an implementation, when the first packet is the IPV6 packet, the application information is carried in a destination address.

In an implementation, when the first packet is the IPV6 packet, the application information is carried in a source address.

In an implementation, when the first packet is the IPV6 packet, the first verification information is carried in the IPV6 extension header.

In an implementation, when the first packet is the IPV6 packet, the first verification information is carried in the destination address.

In an implementation, when the first packet is the IPV6 packet, the first verification information is carried in the source address.

In an implementation, the first packet is a Multiprotocol Label Switching (MPLS) packet.

In an implementation, when the first packet is the MPLS packet, the application information is carried in a label value field.

In an implementation, when the first packet is the MPLS packet, the application information is carried in an extension type-length-value (TLV) field.

In an implementation, when the first packet is the MPLS packet, the first verification information is carried in the label value field.

In an implementation, when the first packet is the MPLS packet, the first verification information is carried in the extension TLV field.

In an implementation, the first packet is a Segment Routing over Internet Protocol version 6 (SRv6) packet.

In an implementation, when the first packet is the SRv6 packet, the application information is carried in a segment routing header (SRH).

In an implementation, when the first packet is the SRv6 packet, the first verification information is carried in the SRH.

In an implementation, the first packet is an Internet Protocol version 4 (IPv4) packet.

In an implementation, when the first packet is the IPV4 packet, the application information is carried in an option field.

In an implementation, when the first packet is the IPV4 packet, the first verification information is carried in the option field.

In an implementation, the first packet is a generic routing encapsulation (GRE) packet.

In an implementation, when the first packet is the GRE packet, the application information is carried in a key field.

In an implementation, when the first packet is the GRE packet, the first verification information is carried in the key field.

In an implementation, the first packet is a virtual extensible local area network (VXLAN) packet.

In an implementation, when the first packet is the VXLAN packet, the application information is carried in a virtual network identifier field.

In an implementation, when the first packet is the VXLAN packet, the application information is carried in a reserved field.

In an implementation, when the first packet is the VXLAN packet, the first verification information is carried in the virtual network identifier field.

In an implementation, when the first packet is the VXLAN packet, the first verification information is carried in the reserved field.

In an implementation, the first packet is a network virtualization using generic routing encapsulation (NVGRE) packet.

In an implementation, when the first packet is the NVGRE packet, the application information is carried in a flow identifier field.

In an implementation, when the first packet is the NVGRE packet, the application information is carried in a virtual network identifier field.

In an implementation, when the first packet is the NVGRE packet, the application information is carried in a reserved field.

In an implementation, when the first packet is the NVGRE packet, the first verification information is carried in the flow identifier field.

In an implementation, when the first packet is the NVGRE packet, the first verification information is carried in the virtual network identifier field.

In an implementation, when the first packet is the NVGRE packet, the first verification information is carried in the reserved field.

In an implementation, the first packet is a generic network virtualization encapsulation (Geneve) packet.

In an implementation, when the first packet is the Geneve packet, the application information is carried in a reserved field.

In an implementation, when the first packet is the Geneve packet, the application information is carried in a variable length options field.

In an implementation, when the first packet is the Geneve packet, the first verification information is carried in the reserved field.

In an implementation, when the first packet is the Geneve packet, the first verification information is carried in the variable length options field.

According to a third aspect, an embodiment of the present disclosure provides an application information verification method. The method may be performed by a first communication apparatus. The first communication apparatus may obtain a first packet, where the first packet includes a digital certificate, and the digital certificate includes application information and first verification information for verifying integrity of the application information. The digital certificate includes the application information and the first verification information. If the digital certificate is valid, it indicates that the first verification information is valid, and correspondingly indicates that the application information passes the integrity verification. Therefore, after receiving the first packet, the first communication apparatus may verify validity of the digital certificate to verify the integrity of the application information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, the first packet further includes second verification information, the second verification information is for verifying the integrity of the application information, and the method further includes verifying the integrity of the application information based on the second verification information. It may be learned that the first packet includes a plurality of pieces of verification information for verifying the integrity of the application information, so that multiple verifications on the application information can be implemented, thereby better avoiding embezzlement of a network resource corresponding to the application information.

In an implementation, the first verification information is an encrypted digest in the digital certificate.

In an implementation, a specific implementation in which the first communication apparatus verifies the integrity of the application information based on the second verification information is similar to the method in which the first communication apparatus verifies the integrity of the application information by using the first verification information according to the first aspect. In an example, the first communication apparatus may obtain third verification information based on a target field in the first packet, where the target field includes the application information; and perform matching verification on the third verification information and the second verification information.

In an implementation, the verifying the integrity of the application information based on the second verification information includes verifying the integrity of the application information based on a digital signature algorithm and the second verification information.

In an implementation, the second verification information is a digital signature obtained by signing the target field in the first packet through a first private key and first hash calculation, and the verifying the integrity of the application information based on a digital signature algorithm and the second verification information includes decrypting the digital signature by using a first public key to obtain a first plaintext; performing second hash calculation on the target field, to obtain a second plaintext, where the first hash calculation and the second hash calculation use a same hash algorithm; and performing matching verification on the first plaintext and the second plaintext.

In an implementation, the first public key is carried in the digital certificate. In this way, the digital certificate can be used to implement double verifications on the application information. One verification is to verify the digital certificate to verify the integrity of the application information included in the digital certificate. The other verification is to verify the integrity of the application information by using the digital signature algorithm by using a public key carried in the digital certificate.

In an implementation, a decryption algorithm for decrypting the digital signature is carried in the digital certificate, and/or the hash algorithm is carried in the digital certificate.

According to a fourth aspect, an embodiment of the present disclosure provides a packet processing method. The method is performed by a second communication apparatus. The method includes the second communication apparatus obtains a first packet, where the first packet includes a digital certificate, the digital certificate includes application information and first verification information, and the first verification information is for verifying integrity of the application information. After obtaining the first packet, the second communication apparatus sends the first packet to a first communication apparatus. The digital certificate includes the application information and the first verification information. If the digital certificate is valid, it indicates that the first verification information is valid, and correspondingly indicates that the application information passes the integrity verification. Therefore, after receiving the first packet, the first communication apparatus may verify validity of the digital certificate to verify the integrity of the application information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, the first verification information is an encrypted digest in the digital certificate.

In an implementation, the first packet further includes second verification information, and the second verification information is for verifying the integrity of the application information.

In an implementation, the second verification information is obtained based on a target field in the first packet, and the target field includes the application information.

In an implementation, the second verification information is obtained by performing calculation on the target field in the first packet by using a first verification method, and the target field includes the application information.

In an implementation, the first verification method is digital signature verification.

In an implementation, the second verification information is a digital signature obtained by signing the target field by using the first private key.

In an implementation, a first public key corresponding to the first private key is carried in the digital certificate, and the first public key is for verifying the second verification information.

In an implementation, a decryption algorithm for decrypting the digital signature is carried in the digital certificate, and/or a hash algorithm for verifying the second verification information is carried in the digital certificate.

In the third aspect and the fourth aspect:

In an implementation, the digital certificate is carried in a packet header of the first packet.

In an implementation, the first packet is an Internet Protocol version 6 IPv6 packet.

In an implementation, when the first packet is the IPV6 packet, the digital certificate is carried in an IPV6 extension header.

In an implementation, when the first packet is the IPV6 packet, the digital certificate is carried in a destination address.

In an implementation, when the first packet is the IPV6 packet, the digital certificate is carried in a source address.

In an implementation, the first packet is a multiprotocol label switching MPLS packet.

In an implementation, when the first packet is the MPLS packet, the digital certificate is carried in a label value field.

In an implementation, when the first packet is the MPLS packet, the digital certificate is carried in a TLV field.

In an implementation, the first packet is a SRv6 packet.

In an implementation, when the first packet is the SRv6 packet, the digital certificate is carried in an SRH.

In an implementation, the first packet is an IPv4 packet.

In an implementation, when the first packet is the IPv4 packet, the digital certificate is carried in an option field.

In an implementation, the first packet is a GRE packet.

In an implementation, when the first packet is the GRE packet, the digital certificate is carried in a key field.

In an implementation, the first packet is a VXLAN packet.

In an implementation, when the first packet is the VXLAN packet, the digital certificate is carried in a virtual network identifier field.

In an implementation, when the first packet is the VXLAN packet, the digital certificate is carried in a reserved field.

In an implementation, the first packet is a NVGRE packet.

In an implementation, when the first packet is the NVGRE packet, the digital certificate is carried in a flow identifier field.

In an implementation, when the first packet is the NVGRE packet, the digital certificate is carried in a virtual network identifier field.

In an implementation, when the first packet is the NVGRE packet, the digital certificate is carried in a reserved field.

In an implementation, the first packet is a Geneve packet.

In an implementation, when the first packet is the Geneve packet, the digital certificate is carried in a reserved field.

In an implementation, when the first packet is the Geneve packet, the digital certificate is carried in a variable length options field.

According to a fifth aspect, an embodiment of the present disclosure provides an application information processing method. The method may be performed by a control management device. The control management device may obtain application information and obtain first verification information based on the application information, where the first verification information is for verifying integrity of the application information. After obtaining the first verification information, the control management device may send the first verification information to a second communication apparatus. After receiving the first verification information, the second communication apparatus may perform a corresponding operation based on the first verification information, for example, generate a first packet including the application information and the first verification information, and send the first packet to a first communication apparatus, so that the first communication apparatus verifies the integrity of the application information. It can be learned that with the use of the solution in this embodiment of the present disclosure, the control management device may obtain the first verification information for verifying the integrity of the application information, and send the first verification information to a network device that forwards a packet carrying the application information, so that the network device that forwards the packet carrying the application information verifies the integrity of the application information. It can be learned that with the use of the solution in this embodiment of the present disclosure, the network device that forwards the packet carrying the application information may verify the integrity of the application information based on the first verification information. This avoids improper use of the application information, and correspondingly avoids improper use of network resources caused by the improper use of the application information.

In an implementation, the obtaining first verification information based on the application information includes performing calculation on the application information based on a first verification method, to obtain the first verification information.

In an implementation, the first verification method is HMAC verification.

In an implementation, when the first verification method is the HAMC verification, the first verification information includes first HMAC verification information. The first HMAC verification information may be obtained by the control management device by performing calculation on the application information by using an HMAC algorithm.

In an implementation, the first verification method is digital signature verification.

In an implementation, when the first verification method is the digital signature verification, the first verification information is a digital signature obtained by signing the application information through a first private key and first hash calculation.

In an implementation, the obtaining first verification information based on the application information includes obtaining a digital certificate based on the application information, where the digital certificate includes the first verification information. In an implementation, the first verification information is an encrypted digest in the digital certificate.

In an implementation, when the first verification information is carried in the digital certificate, during specific implementation in which the control management device sends the first verification information to a second communication apparatus, for example, the control management device may send the digital certificate to the second communication apparatus.

In an implementation, the method further includes obtaining second verification information based on the application information, where the second verification information is for verifying the integrity of the application information; and sending the second verification information to the second communication apparatus. In this way, the control management device may generate a plurality of pieces of verification information for verifying the integrity of the application information to implement multiple verifications on the application information, and more effectively avoid embezzlement of a network resource corresponding to the application information.

In an implementation, the obtaining second verification information based on the application information includes performing calculation on the application information based on a second verification method, to obtain the second verification information.

In an implementation, the second verification method is the HMAC verification.

In an implementation, the second verification information includes second HMAC verification information.

In an implementation, the second verification method is the digital signature verification.

In an implementation, the second verification information is a digital signature obtained by signing the application information through a second private key and second hash calculation.

In an implementation, the first verification method and the second verification method are different verification methods. For example, the first verification method is the HMAC verification, and the second verification method is the digital signature verification. For another example, the first verification method is the digital signature verification, and the second verification method is the HAMC verification.

According to a sixth aspect, an embodiment of the present disclosure provides an application information verification method. The method may be performed by a first communication apparatus. The first communication apparatus may obtain application information and at least one piece of verification information, where the at least one piece of verification information is for verifying integrity of the application information. After obtaining the application information and the at least one piece of verification information, the first communication apparatus may verify the integrity of the application information based on the at least one piece of verification information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, during specific implementation in which the first communication apparatus obtains the application information and the at least one piece of verification information, for example, the first communication apparatus may receive a first packet from another device, where the first packet includes the application information and the at least one piece of verification information.

In an implementation, the first packet may carry one or more pieces of verification information for verifying the integrity of the application information. In an example, the first packet may include first verification information.

In an implementation, during specific implementation in which the first communication apparatus verifies the integrity of the application information based on the first verification information, the first communication apparatus may obtain third verification information based on a first target field in the first packet, where the first target field includes the application information. After obtaining the third verification information, the first communication apparatus performs matching verification on the third verification information and the first verification information. The matching verification performed on the third verification information and the first verification information may be, for example, comparison of the third verification information and the first verification information. If the third verification information and the first verification information are the same, the matching verification succeeds; or if the third verification information and the first verification information are different, the matching verification fails. In this way, the integrity of the application information may be verified.

In an implementation, during specific implementation in which the first communication apparatus verifies the integrity of the application information based on the first verification information, the first communication apparatus may verify, for example, the integrity of the application information based on a first verification method and the first verification information.

In an implementation, the first verification method is HMAC verification.

In an implementation, when the first verification method is the HMAC verification, the first verification information included in the first packet may be first HMAC verification information. The first HMAC verification information may be obtained by performing HMAC calculation on the first target field in the first packet. In this case, during specific implementation in which the first communication apparatus verifies the integrity of the application information based on a first verification method and the first verification information, the first communication apparatus may perform HMAC calculation on the first target field in the first packet to obtain second HMAC verification information, and then perform matching verification on the first HMAC verification information and the second HMAC verification information, to verify the integrity of the application information.

In an implementation, the first verification method is digital signature verification.

In an implementation, when the first verification method is the digital signature-based verification, the first verification information is a digital signature obtained by signing the first target field in the first packet through a first private key and first hash calculation. In this case, during specific implementation in which the first communication apparatus verifies the integrity of the application information based on a first verification method and the first verification information, the first communication apparatus may decrypt the digital signature by using a first public key to obtain a first plaintext; and perform second hash calculation on the first target field to obtain a second plaintext, where the first hash calculation and the second hash calculation use a same hash algorithm; and then the first communication apparatus performs matching verification on the first plaintext and the second plaintext.

US 12,579,317 B2

13

In an implementation, the first packet further includes a digital certificate, and the digital certificate includes the first public key. In this embodiment of the present disclosure, the digital certificate may be a digital certificate of a sending device of the first packet, and the digital certificate may be considered as an identity certificate of the sending device of the first packet. When the first public key is carried in the digital certificate, validity of the first public key can be ensured.

In an implementation, the digital certificate further includes a decryption algorithm for decrypting the digital signature, and/or the hash algorithm. When the decryption algorithm for decrypting the digital signature is carried in the digital signature, validity of the decryption algorithm can be ensured. When the hash algorithm is carried in the digital signature, validity of the hash algorithm can be ensured.

In an implementation, the method further includes verifying validity of the digital certificate. It may be understood that validity of the sending device of the first packet may be verified by verifying the validity of the digital certificate. Correspondingly, if the digital certificate further carries other information, for example, carries the first public key or the decryption algorithm for decrypting the digital signature, and/or the hash algorithm, validity of the other information carried in the digital certificate may also be verified.

In an implementation, the first verification method is IPsec-based integrity verification. The IPsec-based integrity verification includes AH verification and ESP verification.

In an implementation, when the first verification method is the AH verification, the first verification information is first AH verification information, and the first AH verification information may be obtained by performing calculation on the first target field in the first packet by using an AH verification algorithm. In this case, during specific implementation in which the first communication apparatus verifies the integrity of the application information based on a first verification method and the first verification information, the first communication apparatus may perform calculation on the first target field in the first packet by using the AH verification algorithm, to obtain second AH verification information; and perform matching verification on the first AH verification information and the second AH verification information.

In an implementation, when the first verification method is the ESP verification, the first verification information is first ESP verification information, and the first ESP verification information may be obtained by performing calculation on the first target field in the first packet by using an ESP verification algorithm. In this case, during specific implementation in which the first communication apparatus verifies the integrity of the application information based on a first verification method and the first verification information, the first communication apparatus may perform calculation on the first target field in the first packet by using the ESP verification algorithm, to obtain second ESP verification information; and perform matching verification on the first ESP verification information and the second ESP verification information.

In an implementation, the first packet includes a digital certificate, and the application information and the at least one verification information are carried in the digital certificate.

In an implementation, when the application information and the at least one piece of verification information are carried in the digital certificate, the first communication apparatus may verify validity of the digital certificate to verify the integrity of the application information.

In an implementation, the verification information carried in the first packet may further include second verification information in addition to the first verification information. Correspondingly, in addition to verifying the application information based on the first verification information, the first communication apparatus may further verify the application information based on the second verification information to implement multiple verifications on the application information.

In an implementation, during specific implementation in which the first communication apparatus verifies the integrity of the application information based on the second verification information, the first communication apparatus may obtain fourth verification information based on a second target field in the first packet, where the second target field includes the application information. After obtaining the fourth verification information, the first communication apparatus performs matching verification on the second verification information and the fourth verification information.

In an implementation, during specific implementation in which the first communication apparatus verifies the integrity of the application information based on the second verification information, the first communication apparatus may verify, for example, the integrity of the application information based on a second verification method and the second verification information.

In an implementation, the second verification method is HMAC verification.

In an implementation, when the second verification method is the HMAC verification, the second verification information included in the first packet may be third HMAC verification information. The third HMAC verification information may be obtained by performing HMAC calculation on the second target field in the first packet. In this case, during specific implementation in which the first communication apparatus verifies the integrity of the application information based on the second verification method and the second verification information, the first communication apparatus may perform HMAC calculation on the second target field in the first packet to obtain fourth HMAC verification information, and then perform matching verification on the third HMAC verification information and the fourth HMAC verification information, to verify the integrity of the application information.

In an implementation, the second verification method is digital signature verification.

In an implementation, when the second verification method is the digital signature-based verification, the second verification information is a digital signature obtained by signing the second target field in the first packet through a second private key and third hash calculation. In this case, during specific implementation in which the first communication apparatus verifies the integrity of the application information based on the second verification method and the second verification information, the first communication apparatus may decrypt the digital signature by using the second public key, to obtain a third plaintext; and perform fourth hash calculation on the target field to obtain a fourth plaintext, where the third hash calculation and the fourth hash calculation use a same hash algorithm; and then the first communication apparatus performs matching verification on the third plaintext and the fourth plaintext.

In an implementation, similar to the first public key, the second public key may also be carried in the digital certificate, to ensure the validity of the second public key. The digital certificate may be carried in the first packet.

In an implementation, the decryption algorithm for decrypting the second verification information, and/or the hash algorithm used for the third hash calculation and the fourth hash calculation may also be carried in the digital certificate.

In an implementation, the second verification method is IPsec-based integrity verification. The IPsec-based integrity verification includes AH verification and ESP verification.

In an implementation, when the second verification method is the AH verification, the second verification information is third AH verification information, and the third AH verification information may be obtained by performing calculation on the second target field in the first packet by using an AH verification algorithm. In this case, during specific implementation in which the first communication apparatus verifies the integrity of the application information based on the second verification method and the second verification information, the first communication apparatus may perform calculation on the second target field in the first packet by using the AH verification algorithm, to obtain fourth AH verification information; and perform matching verification on the third AH verification information and the fourth AH verification information.

In an implementation, when the second verification method is the ESP verification, the second verification information is third ESP verification information, and the third ESP verification information may be obtained by performing calculation on the second target field in the first packet by using an ESP verification algorithm. In this case, during specific implementation in which the first communication apparatus verifies the integrity of the application information based on the second verification method and the second verification information, the first communication apparatus may perform calculation on the second target field in the first packet by using the ESP verification algorithm, to obtain fourth ESP verification information; and perform matching verification on the third ESP verification information and the fourth ESP verification information.

In an implementation, the first communication apparatus is a network device. The network device verifies the integrity of the application information, so that whether the application information is embezzled can be determined, thereby ensuring that a network resource corresponding to the application information is not embezzled.

In an implementation, the first communication apparatus includes an ACC device, a CPE device, an RG, a data center server access leaf device, a DC GW, an ASBR, a BNG, or a PE device.

In an implementation, after the first communication apparatus verifies the integrity of the application information, if the application information passes the verification, it indicates that the application information in the first packet is valid. Therefore, the first communication apparatus may forward the first packet. In an example, the first communication apparatus may determine a corresponding network resource based on the application information and forward the first packet by using the determined network resource.

In an implementation, after the first communication apparatus verifies the integrity of the application information, if the application information fails the verification, it indicates that the application information in the first packet is invalid. Therefore, the first communication apparatus may discard the first packet. This avoids embezzlement of the network resource corresponding to the application information.

According to a seventh aspect, an embodiment of the present disclosure provides an application information processing method. The method may be performed by a second communication apparatus. The second communication apparatus may obtain application information and at least one piece of verification information. The at least one piece of verification information is for verifying integrity of the application information. After obtaining the application information and the at least one piece of verification information, the second communication apparatus may send the application information and the at least one piece of verification information to a first communication apparatus, so that the first communication apparatus verifies the integrity of the application information based on the at least one piece of verification information. It can be learned that, with the use of the solutions in this embodiment of the present disclosure, the first communication apparatus can verify the integrity of the application information. This avoids improper use of the application information, and correspondingly avoids improper use of network resources caused by the improper use of the application information.

In an implementation, the first communication apparatus may obtain a first packet including the application information and the at least one piece of verification information and send the application information and the at least one piece of verification information to the first communication apparatus in a manner of sending the first packet to the first communication apparatus. In an example, the first communication apparatus may encapsulate the application information and the at least one piece of verification information in a service packet to obtain the first packet.

In an implementation, the first packet may carry one or more pieces of verification information for verifying the integrity of the application information. In an example, the first packet may include the first verification information.

In an implementation, the first verification information is obtained based on a first target field in the first packet, and the first target field includes the application information. In an example, the second communication apparatus may obtain a first target field, and then obtain the first verification information based on the first target field. Further, the second communication apparatus encapsulates the first verification information into the first packet, to obtain the first packet including the application information and the first verification information.

In an implementation, the first verification information is obtained by performing calculation on the first target field in the first packet by using a first verification method, and the first target field includes the application information. In an example, the second communication apparatus may obtain a first target field, and then perform calculation on the first target field in the first packet by using a first verification method, to obtain the first verification information. Further, the second communication apparatus encapsulates the first verification information into the first packet, to obtain the first packet including the application information and the first verification information.

In an implementation, the first verification method is HMAC verification.

In an implementation, the first verification information includes first HMAC verification information.

In an implementation, the first verification method is digital signature verification.

In an implementation, the first verification information is a digital signature obtained by signing the first target field by using the first private key.

In an implementation, the first verification information is an encrypted digest in a digital certificate, and the digital certificate further includes the application information.

In an implementation, when the first verification method is the HMAC verification, or the first verification method is the digital signature verification, or the first verification information is the encrypted digest in the digital certificate, the first verification information is sent by a control management device to the second communication apparatus. In an example, the second communication apparatus may send the application information to the control management device, and the control management device performs calculation on the application information to obtain the first verification information. Further, the control management device sends the calculated first verification information to the second communication apparatus.

In an implementation, the first verification method is IPsec-based integrity verification.

In an implementation, the first verification information is first AH verification information. In this case, the first AH verification information may be obtained by the second communication apparatus by performing calculation on the first target field in the first packet by using an AH verification algorithm.

In an implementation, the first verification information is first ESP verification information. In this case, the first ESP authentication information may be obtained by the second communication apparatus by performing calculation on the first target field in the first packet by using an ESP verification algorithm.

In an implementation, the verification information carried in the first packet may further include second verification information in addition to the first verification information. Correspondingly, after sending the first packet to the first communication apparatus, in addition to verifying the application information based on the first verification information, the first communication apparatus may further verify the application information based on the second verification information to implement multiple verifications on the application information.

In an implementation, the second verification information is obtained based on a second target field in the first packet, and the second target field includes the application information. In an example, the second communication apparatus may obtain a second target field, and then obtain the second verification information based on the second target field. Further, the second communication apparatus encapsulates the second verification information into the first packet, to obtain the first packet including the application information and the second verification information.

In an implementation, the second verification information is obtained by performing calculation on the second target field in the first packet by using a second verification method, and the second target field includes the application information. In an example, the second communication apparatus may obtain a second target field, and then perform calculation on the second target field in the first packet by using the second verification method, to obtain the second verification information. Further, the second communication apparatus encapsulates the second verification information into the first packet, to obtain the first packet including the application information and the second verification information.

In an implementation, the second verification method is HMAC verification.

In an implementation, the second verification information includes third HMAC verification information.

In an implementation, the first verification method is digital signature verification.

In an implementation, the first verification information is a digital signature obtained by signing the second target field by using a second private key.

In an implementation, the second verification information is an encrypted digest in a digital certificate, and the digital certificate further includes the application information.

In an implementation, when the second verification method is the HMAC verification, or the second verification method is the digital signature verification, or the second verification information is the encrypted digest in the digital certificate, the second verification information is sent by a control management device to the second communication apparatus. In an example, the second communication apparatus may send the application information to the control management device, and the control management device performs calculation on the application information to obtain the second verification information. Further, the control management device sends the calculated second verification information to the second communication apparatus.

In an implementation, the second verification method is IPsec-based integrity verification.

In an implementation, the second verification information is third AH verification information. In this case, the third AH verification information may be obtained by the second communication apparatus by performing calculation on the second target field in the first packet by using an AH verification algorithm.

In an implementation, the second verification information is third ESP verification information. In this case, the third ESP authentication information may be obtained by the second communication apparatus by performing calculation on the second target field in the first packet by using an ESP verification algorithm.

In the seventh aspect and the eighth aspect:

In an implementation, the first verification method and the second verification method are different verification algorithms. For example, if the first verification method is the HMAC verification, the second verification method may be one of the digital signature verification, the AH verification, and the ESP verification. For another example, if the first verification method is the digital signature verification, the second verification method may be one of the HMAC verification, the AH verification, and the ESP verification. For another example, if the first verification method is the AH verification, the second verification method may be one of the HMAC verification, the digital signature verification, and the ESP verification. For still another example, if the first verification method is the ESP verification, the second verification method may be one of the HMAC verification, the digital signature verification, and the AH verification.

In an implementation, the application information and the at least one piece of verification information are carried in a packet header of the first packet.

In an implementation, the first packet is an IPV6 packet.

In an implementation, when the first packet is the IPV6 packet, the application information is carried in an IPV6 extension header.

In an implementation, when the first packet is the IPV6 packet, the application information is carried in a destination address.

In an implementation, when the first packet is the IPv6 packet, the application information is carried in a source address.

In an implementation, when the first packet is the IPV6 packet, the at least one piece of verification information is carried in the IPV6 extension header.

In an implementation, when the first packet is the IPV6 packet, the at least one piece of verification information is carried in the destination address.

In an implementation, when the first packet is the IPV6 packet, the at least one piece of verification information is carried in the source address.

In an implementation, the first packet is a MPLS packet.

In an implementation, when the first packet is the MPLS packet, the application information is carried in a label value field.

In an implementation, when the first packet is the MPLS packet, the application information is carried in an extension TLV field.

In an implementation, when the first packet is the MPLS packet, the at least one piece of verification information is carried in the label value field.

In an implementation, when the first packet is the MPLS packet, the at least one piece of verification information is carried in the extension TLV field.

In an implementation, the first packet is a SRv6 packet.

In an implementation, when the first packet is the SRv6 packet, the application information is carried in an SRH.

In an implementation, when the first packet is the SRv6 packet, the at least one piece of verification information is carried in the SRH.

In an implementation, the first packet is an IPV4 packet.

In an implementation, when the first packet is the IPv4 packet, the application information is carried in an option field.

In an implementation, when the first packet is the IPV4 packet, the at least one piece of verification information is carried in the option field.

In an implementation, the first packet is a GRE packet.

In an implementation, when the first packet is the GRE packet, the application information is carried in a key field.

In an implementation, when the first packet is the GRE packet, the at least one piece of verification information is carried in the key field.

In an implementation, the first packet is a VXLAN packet.

In an implementation, when the first packet is the VXLAN packet, the application information is carried in a virtual network identifier field.

In an implementation, when the first packet is the VXLAN packet, the application information is carried in a reserved field.

In an implementation, when the first packet is the VXLAN packet, the at least one piece of verification information is carried in the virtual network identifier field.

In an implementation, when the first packet is the VXLAN packet, the at least one piece of verification information is carried in the reserved field.

In an implementation, the first packet is a NVGRE packet.

In an implementation, when the first packet is the NVGRE packet, the application information is carried in a flow identifier field.

In an implementation, when the first packet is the NVGRE packet, the application information is carried in a virtual network identifier field.

In an implementation, when the first packet is the NVGRE packet, the application information is carried in a reserved field.

In an implementation, when the first packet is the NVGRE packet, the at least one piece of verification information is carried in the flow identifier field.

In an implementation, when the first packet is the NVGRE packet, the at least one piece of verification information is carried in the virtual network identifier field.

In an implementation, when the first packet is the NVGRE packet, the at least one piece of verification information is carried in the reserved field.

In an implementation, the first packet is a Geneve packet.

In an implementation, when the first packet is the Geneve packet, the application information is carried in a reserved field.

In an implementation, when the first packet is the Geneve packet, the application information is carried in a variable length options field.

In an implementation, when the first packet is the Geneve packet, the at least one piece of verification information is carried in the reserved field.

In an implementation, when the first packet is the Geneve packet, the at least one piece of verification information is carried in the variable length options field.

According to an eighth aspect, an embodiment of the present disclosure provides a first communication apparatus including a communication interface and a processor connected to the communication interface. By using the communication interface and the processor, the first communication apparatus is configured to perform the method according to any one of the first aspect or the implementations of the first aspect, the first communication apparatus is configured to perform the method according to any one of the third aspect or the implementations of the third aspect, or the first communication apparatus is configured to perform the method according to any one of the sixth aspect or the implementations of the sixth aspect.

According to a ninth aspect, an embodiment of the present disclosure provides a second communication apparatus including a communication interface and a processor connected to the communication interface. By using the communication interface and the processor, the second communication apparatus is configured to perform the method according to any one of the second aspect or the implementations of the second aspect, the second communication apparatus is configured to perform the method according to any one of the fourth aspect or the implementations of the fourth aspect, or the second communication apparatus is configured to perform the method according to any one of the seventh aspect or the implementations of the seventh aspect.

According to a tenth aspect, an embodiment of the present disclosure provides a control management device including a communication interface and a processor connected to the communication interface. By using the communication interface and the processor, the control management device is configured to perform the method according to any one of the fifth aspect or the possible implementations of the fifth aspect.

According to an eleventh aspect, an embodiment of the present disclosure provides a first communication apparatus. The first communication apparatus includes a memory and a processor. The memory is configured to store program code. The processor is configured to run instructions in the program code, to enable the first communication apparatus to perform the method according to any one of the first aspect or the possible implementations of the first aspect, the first communication apparatus is enabled to perform the method according to any one of the third aspect or the possible implementations of the third aspect, or the first communication apparatus is enabled to perform the method according to any one of the sixth aspect or the implementations of the sixth aspect.

According to a twelfth aspect, an embodiment of the present disclosure provides a second communication apparatus. The second communication apparatus includes a memory and a processor. The memory is configured to store program code. The processor is configured to run instructions in the program code, to enable the second communication apparatus to perform the method according to any one of the second aspect or the implementations of the second aspect, to enable the second communication apparatus to perform the method according to any one of the fourth aspect or the implementations of the fourth aspect, or to enable the second communication apparatus to perform the method according to any one of the seventh aspect or the implementations of the seventh aspect.

According to a thirteenth aspect, an embodiment of the present disclosure provides a control management device. The control management device includes a memory and a processor. The memory is configured to store program code. The processor is configured to run instructions in the program code, to enable the control management device to perform the method according to any one of the fifth aspect or the implementations of the fifth aspect.

According to a fourteenth aspect, an embodiment of the present disclosure provides a computer-readable storage medium. The computer-readable storage medium stores instructions. When the instructions are run on a computer, the computer is enabled to perform the method according to any one of the first aspect or the implementations of the first aspect, the computer is enabled to perform the method according to any one of the second aspect or the implementations of the second aspect, the computer is enabled to perform the method according to any one of the third aspect or the implementations of the third aspect, the computer is enabled to perform the method according to any one of the fourth aspect and the implementations of fourth aspect, the computer is enabled to perform the method according to any one of the fifth aspect and the implementations of the fifth aspect, the computer is enabled to perform the method according to any one of the sixth aspect and the implementations of the sixth aspect, or the computer is enabled to perform the method according to any one of the seventh aspect and the implementations of the seventh aspect.

According to a fifteenth aspect, an embodiment of the present disclosure provides a communication system, including the first communication apparatus according to the eighth aspect or the eleventh method and the second communication apparatus according to the ninth aspect or the twelfth aspect.

According to a sixteenth aspect, an embodiment of the present disclosure provides a communication system, including the second communication apparatus according to the ninth aspect or the twelfth aspect, and the control management device according to the tenth aspect or the thirteenth aspect.

BRIEF DESCRIPTION OF DRAWINGS

To describe the technical solutions in embodiments of the present disclosure more clearly, the following briefly describes the accompanying drawings. It is clear that the accompanying drawings in the following description show some embodiments of the present disclosure, and persons of ordinary skill in the art may still derive other drawings from these accompanying drawings without creative efforts.

FIG. 4D is a structural diagram of a packet 1 according to an embodiment of the present disclosure;

FIG. 5 is a signaling interaction diagram of an application information verification method according to an embodiment of the present disclosure;

FIG. 12 is a schematic flowchart of a packet processing method according to an embodiment of the present disclosure;

FIG. 13 is a schematic structural diagram of a communication apparatus according to an embodiment of the present disclosure;

DESCRIPTION OF EMBODIMENTS

Embodiments of the present disclosure provide an application information verification method, to avoid improper use of a network resource caused by improper use of application information.

An APP described in the present disclosure may also be referred to as an application program or application software. The application is software that provides a function used by a service and that includes a computer program for completing one or more specific tasks. The application usually needs to interact with a user. Each application may belong to a plurality of services and may run on one or more servers or run on user equipment. In embodiments of the present disclosure, the application program may be, for example, a game APP, a video APP, an email APP, an instant messaging APP, a traffic information APP, or a weather forecast APP. The application is usually installed on a terminal device. For ease of understanding, possible application scenarios of embodiments of the present disclosure are first described.

Figure 1:
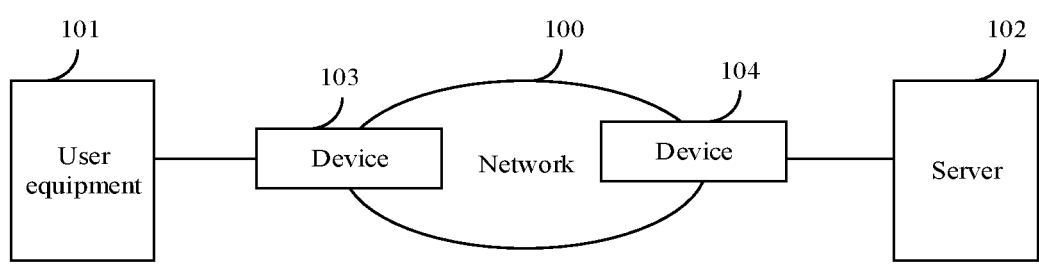
FIG. 1 is a schematic diagram of an example application scenario according to an embodiment of the present disclosure.

FIG. 1 is a schematic diagram of an example application scenario according to an embodiment of the present disclosure.

In the application scenario shown in FIG. 1, user equipment 101 on which an APP is installed may send a service packet A to a server 102 of the APP over a network 100, where the service packet A may include application information of the APP. The network 100 includes at least a device 103 and a device 104. The device 103 that receives the service packet A may allocate a corresponding network resource to the service packet A based on the application information carried in the service packet A, so that the service packet A is forwarded to the server 102 by using the network resource. For example, the service packet A is forwarded to the server 102 by using a high-bandwidth link. Certainly, the server 102 may alternatively send a service packet B to the user equipment 101 over the network 100. Similarly, the service packet B may also carry the application information of the APP. The device 104 receiving the service packet B may allocate a network resource to the service packet B based on the application information carried in the service packet B to forward the service packet B to the user equipment 101 by using the network resource. The device 103 and the device 104 mentioned herein may be edge devices of the network 100.

The application scenario shown in FIG. 1 may be used in network scenarios such as a government and enterprise private line, a home bandwidth, and a mobile network. The user equipment 101 may be an IoT device or a terminal device. The terminal device mentioned herein may be a mobile phone or a personal computer (PC), for example, a tablet PC, a notebook computer, a super mobile personal computer, or a personal digital assistant. This not specifically limited in embodiments of the present disclosure.

If the application scenario shown in FIG. 1 is applied to the government and enterprise private line, the device 103 may be a CPE or an ACC device of an access network, and the device 104 may be a DC GW, a data center server access device leaf, or an ASBR.

If the application scenario shown in FIG. 1 is applied to home bandwidth, the device 103 may be an RG or an ACC device of an access network, and the device 104 may be a DC GW, a data center server access device leaf, or an ASBR.

If the application scenario shown in FIG. 1 is applied to a mobile network, the device 103 may be a mobile network base station, a UPF device of a core network, or an ACC device of an access network, and the device 104 may be a DC GW, a data center server access device leaf, or an ASBR.

Figure 2:
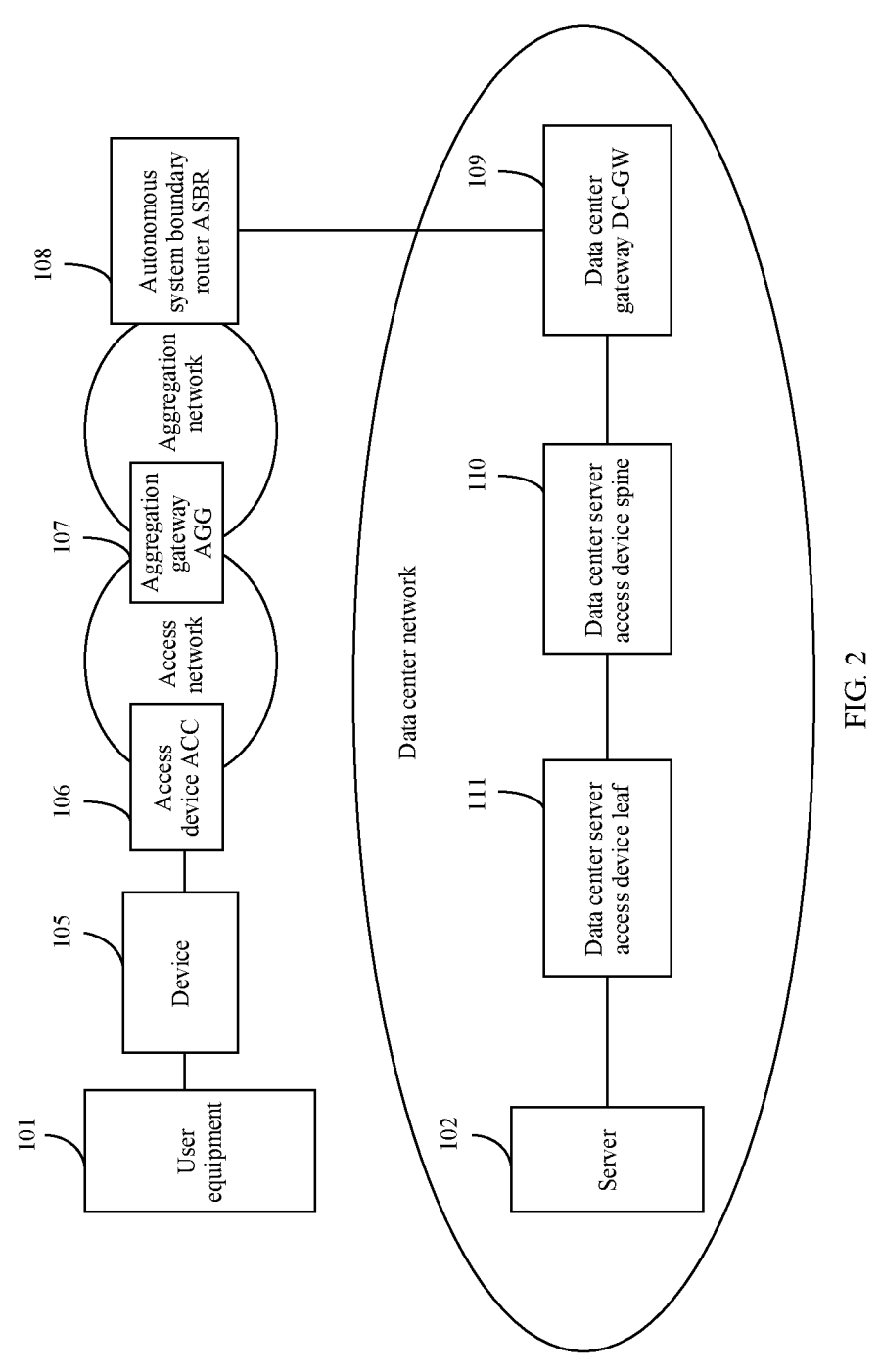
FIG. 2 is a schematic diagram of another example network scenario according to an embodiment of the present disclosure.

In some embodiments, the network 100 may include an access network, an aggregation network, and a data center network. FIG. 2 is a schematic diagram of another example network scenario according to an embodiment of the present disclosure. The network scenario shown in FIG. 2 may be applied to a home bandwidth or a government and enterprise private line. A network scenario corresponding to a mobile network is not described in detail herein.

In the scenario shown in FIG. 2, user equipment 101 on which an APP is installed may generate a service packet A including application information, and sequentially pass through a device 105, an access device ACC 106 of an access network, an aggregation (AGG) device 107 of an aggregation network, an ASBR 108, a DC GW 109, a data center server access device spine 110, and a data center server access device leaf 111, to arrive at a server 102 of the application program. In a home bandwidth scenario, the device 105 may be an RG. In a network scenario of the government and enterprise private line, the device 105 may be a CPE.

It may be learned from the foregoing descriptions that, because the network device 103 may provide corresponding quality of service for the service packet A based on the application information carried in the service packet A, and the network device 104 may provide corresponding quality of service for a service packet B based on application information carried in the service packet B, if the application information is not used properly, for example, embezzled, a network resource may be used improperly.

Example 1: A paid APP in the device 101 uses application information AAAA, and the application information AAAA corresponds to a high-bandwidth and low-latency network resource. A free APP in the device 101 embezzles the application information AAAA and embezzles the high-bandwidth and low-latency network resource.

Example 2: An APP in the device 101 logs in to a paid user account 1 and is authorized to use application information AAAA. A cracked version of the APP is installed on a second device, and the second device logs in to a free user account B. The cracked APP embezzles the application information AAAA and embezzles the network resource of the paid user account 1.

Example 3: A paid APP in the device 101 uses application information AAAA, and a free APP in another device embezzles the application information AAAA, and embezzles a network resource of the paid APP.

Example 4: An APP in the device 101 logs in to a paid user account and is authorized to use application information AAAA. A same APP on a second device logs in to a free user account and is authorized to use application information BBBB. To embezzle a network resource of the paid user account, the free user account changes the application information BBBB to the application information AAAA.

Therefore, embodiments of the present disclosure provide an application information verification method, to avoid improper use of a network resource caused by improper use of application information. The following describes the application information verification method with reference to the accompanying drawings.

It should be noted that, unless otherwise specified, in the following descriptions of embodiments of the present disclosure, descriptions of "object+sequence number" such as a hash algorithm n, a public key n, and a private key n are for distinguishing between similar objects, but are not for limiting a specific order or sequence. In addition, for a same object, content of the object is not directly associated with a sequence number of the object. Objects with different sequence numbers may have same content or different content. This not specifically limited in embodiments of the present disclosure. For example, the hash algorithm 1 and the hash algorithm 2 may be a same algorithm or may be different algorithms.

It should be noted that, a communication apparatus mentioned in embodiments of the present disclosure may be a network device such as a switch or a router, or may be some components on a network device, for example, a board or a line card on the network device or may be a functional module on the network device. Alternatively, the communication apparatus may be user equipment or a server, or some components on the user equipment or the server. This not specifically limited in embodiments of the present disclosure.

Figure 3:
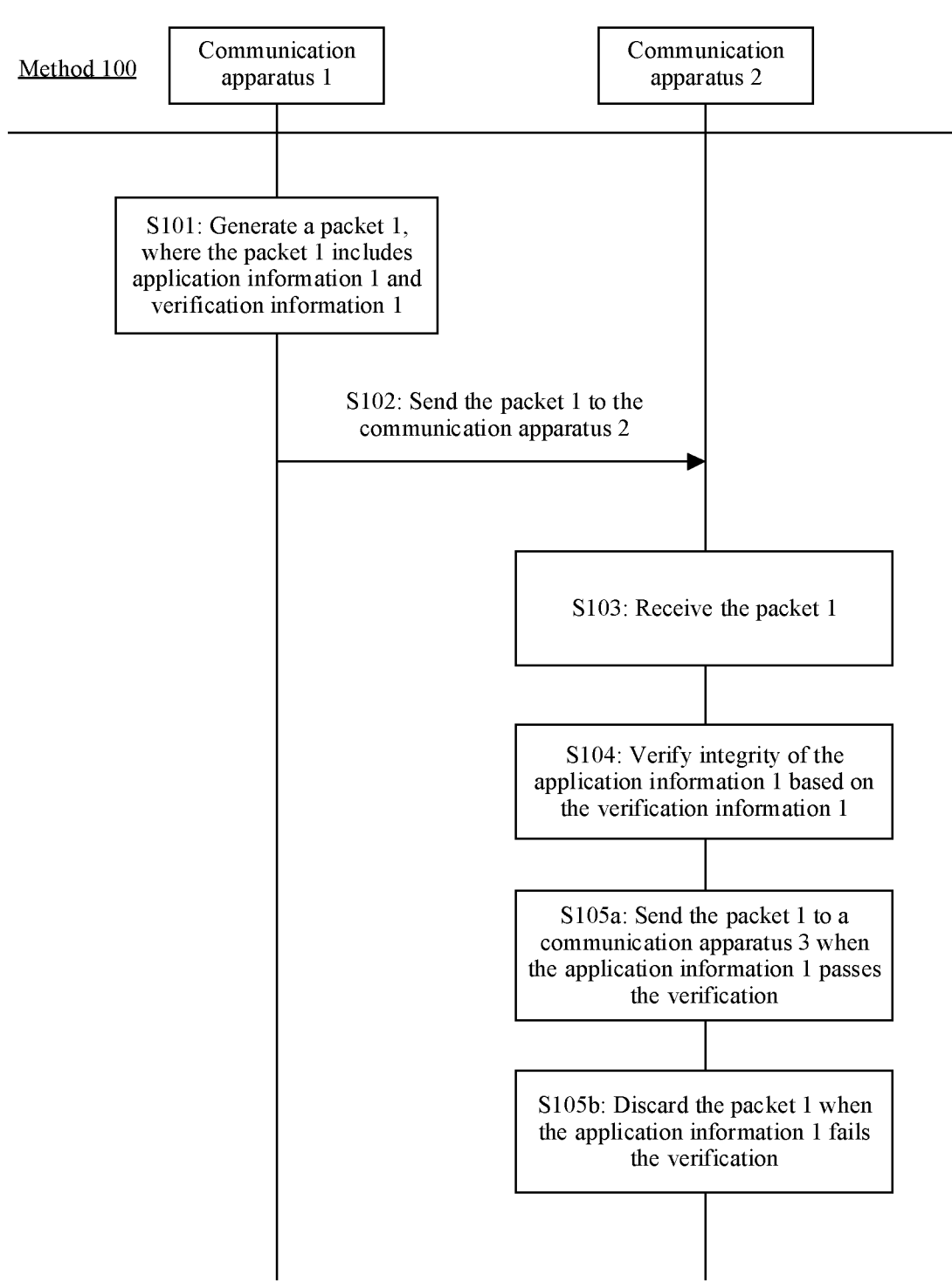
FIG. 3 is a signaling interaction diagram of an application information verification method according to an embodiment of the present disclosure.
Figure 4A:
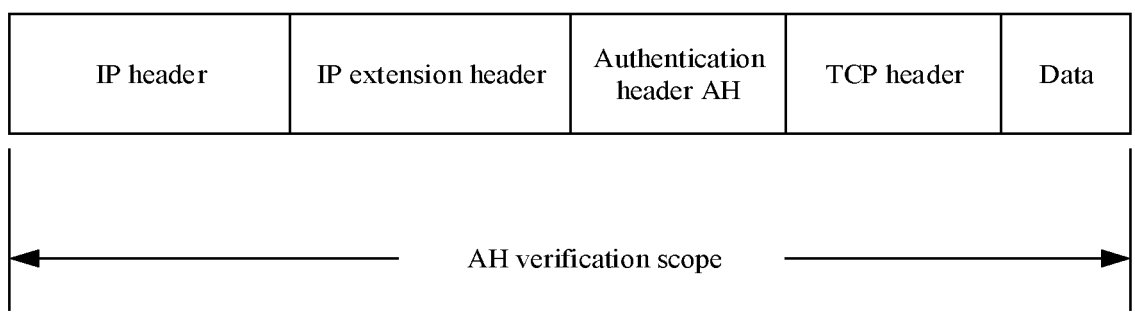
FIG. 4A is a structural diagram of a packet 1 according to an embodiment of the present disclosure.
Figure 4B:
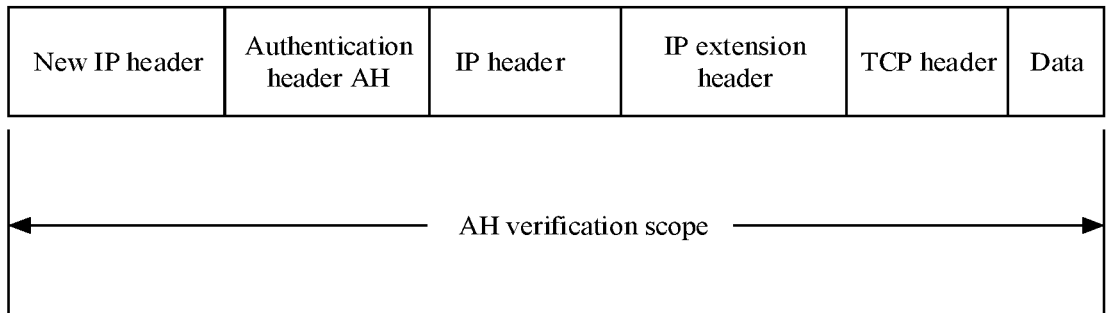
FIG. 4B is a structural diagram of a packet 1 according to an embodiment of the present disclosure.
Figure 4C:
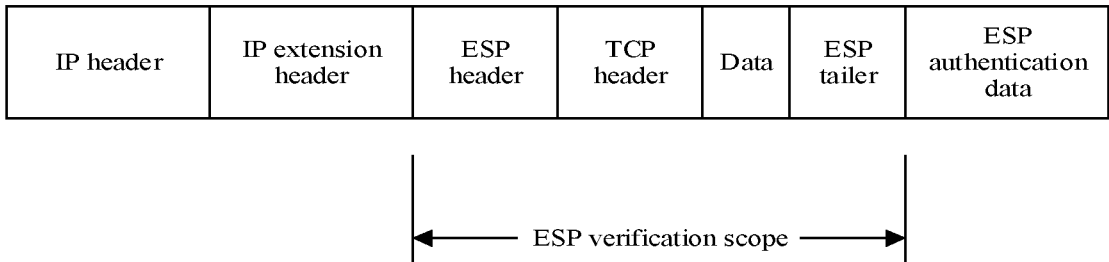
FIG. 4C is a structural diagram of a packet 1 according to an embodiment of the present disclosure.

FIG. 3 is a signaling interaction diagram of an application information verification method according to an embodiment of the present disclosure.

The application information verification method 100 shown in FIG. 3 may be performed by a communication apparatus 1 and a communication apparatus 2.

For example, when the communication apparatus 1 is used in user equipment 101, the communication apparatus 2 is used in a device 103, and a communication apparatus 3 is used in a server 102. When the communication apparatus 1 is used in a server 102, the communication apparatus 2 is used in a device 104, and a communication apparatus 3 is used in user equipment 101. The method 100 may be implemented, for example, by performing the following steps S101 to S105*a* or S101 to S105*b*.

S101: The communication apparatus 1 generates a packet 1, where the packet 1 includes application information 1 and verification information 1.

For the communication apparatus 1, refer to the foregoing descriptions of the user equipment 101 or the server 102. Details are not described herein again.

In the present disclosure, application information is information corresponding to an APP installed on the communication apparatus 1. In an implementation, the application information may include one or more of the following: a service level agreement (SLA) level, an application identifier, a user identifier, a flow identifier (flow ID), and a reserved parameter. The application identifier identifies an application. The user identifier identifies a user who uses the application. The user identifier may be, for example, an identifier of an account that logs in to the application. The flow identifier identifies a service packet corresponding to the application.

In this embodiment of the present disclosure, the verification information 1 is for verifying integrity of the application information 1. The integrity verification performed on the application information 1 includes verification of whether the application information 1 is lost, whether a bit error occurs, or whether the application information 1 is tampered with or forged.

In this embodiment of the present disclosure, the communication apparatus 1 may obtain the application information 1 and obtain the verification information 1 based on the application information 1. After obtaining the application information 1 and the verification information 1, the communication apparatus 1 may encapsulate a service packet of an APP 1 and include the application information 1 and the verification information 1 in the service packet, to obtain the packet 1.

In an implementation of this embodiment of the present disclosure, the verification information 1 may be obtained by the communication apparatus 1 based on a field in the packet 1. In an example, the verification information 1 may be obtained by the communication apparatus 1 by performing calculation on the field in the packet 1 by using the verification algorithm 1. The field in the packet 1 includes the application information 1.

In an implementation of this embodiment of the present disclosure, the verification algorithm 1 may be HMAC verification.

When the verification algorithm 1 is the HMAC verification, in an implementation, the communication apparatus 1 may append a key 1 to a field 1 as an input of a hash algorithm 1, to obtain the verification information 1. The appending the key 1 to the field 1 may be, for example, appending the key 1 to the tail of the field 1, adding the key 1 to the head of the field 1, or inserting the key 1 into the middle of the field 1. In an example, the field 1 may include only the application information 1. In another example, the field 1 may further include another field in the packet 1 in addition to the application information 1.

When the verification algorithm 1 is the HMAC verification, in another implementation, the communication apparatus 1 obtains a parameter 1 and a parameter 2, and the parameter 1 and the parameter 2 have a same quantity of bits. For example, both the parameter 1 and the parameter 2 are 64 bits. The communication apparatus 1 pads a value to the head or the tail of a key 2, for example, pads 0, so that the key 2 obtained through value padding and the parameter 1 have a same quantity of bits. The communication apparatus 1 performs calculation on the key 2 obtained through value padding and the parameter 1, for example, performs exclusive OR calculation to obtain a key 2'. Then, the communication apparatus 1 appends the key 2' to the field 1 as an input of a hash algorithm 2, to obtain HMAC 1. The communication apparatus 1 performs calculation on the key 2 obtained through value padding and the parameter 2, for example, performs exclusive OR calculation to obtain a key 2". Then, the communication apparatus 1 appends the key 2" to the HMAC 1 as the input of the hash algorithm 2 to obtain HMAC 2. The HMAC 2 is the verification information 1. For descriptions of "appending the key 2' to the field 1" and "appending the key 2" to the HMAC 1", refer to the foregoing descriptions of "appending the key 1 to the field 1". Details are not described herein again.

In an implementation of this embodiment of the present disclosure, when the field 1 includes only the application information 1, the verification information 1 may alternatively be obtained by the control management device by performing calculation based on the application information 1. For example, the communication apparatus 1 sends the application information 1 to the control management device, and the control management device performs calculation on the application information 1 by using an HMAC algorithm to obtain the verification information 1 and sends the verification information 1 to the communication apparatus 1. In this way, the communication apparatus 1 obtains the verification information 1.

In an implementation of this embodiment of the present disclosure, the verification algorithm 1 may be digital signature verification.

When the verification algorithm 1 is the digital signature verification, in an implementation, the communication apparatus 1 may perform a hash operation on a field 2 in the packet 1 by using a hash algorithm 3, to obtain a hash digest 1. Then, the communication apparatus 1 encrypts the hash digest 1 by using a private key 1 and an encryption algorithm 1, to obtain a digital signature 1 to obtain the verification information 1. The verification information 1 mentioned herein is the digital signature 1. In an example, the field 2 may include only the application information 1. In another example, the field 2 may further include another field in the packet 1 in addition to the application information 1.

In an implementation of this embodiment of the present disclosure, when the field 2 includes only the application information 1, the verification information 1 may alternatively be obtained by the control management device by performing calculation based on the application information 1. For example, the communication apparatus 1 sends the application information 1 to the control management device, and the control management device performs calculation on the application information 1 by using a digital signature algorithm to obtain the verification information 1 and sends the verification information 1 to the communication apparatus 1. In this way, the communication apparatus 1 obtains the verification information 1.

In an implementation of this embodiment of the present disclosure, when the verification algorithm 1 is the digital signature verification, the packet 1 may further include a digital certificate 1 of the communication apparatus 1 in addition to the application information 1 and the verification information 1. The digital certificate 1 includes a public key 1. The public key 1 and the private key 1 are a pair of asymmetric keys. In other words, the public key 1 may be for decrypting the digital signature 1. In some embodiments, the digital certificate 1 further includes the hash algorithm 3 and a decryption algorithm 1 in addition to the public key 1. The decryption algorithm 1 mentioned herein corresponds to the foregoing encryption algorithm 1 and is for decrypting the digital signature 1.

In this embodiment of the present disclosure, the digital certificate 1 of the communication apparatus 1 may be sent by a certificate authority (CA) device to the communication apparatus 1. The CA device mentioned herein may be, for example, the control management device, or may be, for example, a CA server. A process in which the communication apparatus 1 obtains the digital certificate 1 is briefly described herein. First, the communication apparatus 1 sends identity information and other information of the communication apparatus 1 to the CA device. The identity information and the other information of the communication apparatus 1 constitute an untrusted digital certificate. The CA device performs hash calculation on the untrusted digital certificate by using a hash algorithm 4, to obtain a hash digest 2. Then, the CA device encrypts the hash digest 2 by using a private key 2 of the CA device, to obtain an encrypted digest 1. Then, the CA authority sends the identity information of the CA authority, the encrypted digest 1, and the untrusted digital certificate to the communication apparatus 1. The identity information of the CA authority, the encrypted digest 1, and the untrusted digital certificate constitute the trusted digital certificate 1 of the communication apparatus 1.

It should be noted herein that the other information sent by the communication apparatus 1 to the CA device may include one or more of the public key 1, the decryption algorithm 1, and the hash algorithm 3. The identity information of the communication apparatus 1 may include, for example, a device identifier of the communication apparatus 1, or may include the application information 1. This not specifically limited in this embodiment of the present disclosure. In this embodiment of the present disclosure, when the identity information of the communication apparatus 1 includes the application information 1, the application information 1 in the packet 1 may be, for example, carried in the digital certificate 1.

In an implementation of this embodiment of the present disclosure, the verification algorithm 1 may be IPSec-based integrity verification.

In this embodiment of the present disclosure, the IPsec-based integrity verification may include AH-based integrity verification and ESP-based integrity verification. When the verification algorithm 1 is the IPsec-based integrity verification, there are two encapsulation formats of the packet 1: a tunnel encapsulation format and a transport encapsulation format. Next, refer to FIG. 4A to FIG. 4D for understanding. FIG. 4A to FIG. 4D respectively show four structural diagrams of the packet 1. The packet 1 shown in FIG. 4A adopts a packet encapsulation format of transport mode and adopts an AH-based integrity verification algorithm. The packet 1 shown in FIG. 4B adopts a packet encapsulation format of tunnel mode and adopts an AH-based integrity verification algorithm. The packet 1 shown in FIG. 4C adopts a packet encapsulation format of transport mode and adopts an ESP-based integrity verification algorithm. The packet 1 shown in FIG. 4D adopts a packet encapsulation format of tunnel mode and adopts an ESP-based integrity verification algorithm.

When the verification algorithm 1 is the AH-based integrity verification, and the packet 1 is encapsulated in transport mode, in an implementation, the communication apparatus 1 may perform calculation on a field 3 in the packet 1 by using an AH verification algorithm 1 to obtain AH verification information 1, that is, obtain the verification information 1. It can be learned from FIG. 4A that the field 3 includes an IP header, an IP extension header, an AH, a Transmission Control Protocol (TCP) header, and data. The application information 1 may be carried in the IP extension header. The IP extension header mentioned herein may be, for example, an IPV6 extension header. The AH verification algorithm 1 mentioned herein may be, for example, HMAC message-digest algorithm (MD5) or HMAC secure hash algorithm (SHA1).

When the verification algorithm 1 is the AH-based integrity verification, and the packet 1 is encapsulated in tunnel mode, in an implementation, the communication apparatus 1 may perform calculation on a field 4 in the packet 1 by using an AH verification algorithm 2 to obtain AH verification information 2, that is, obtain the verification information 1. It can be seen from FIG. 4B that the field 4 includes a new IP header, an AH, an IP header, an IP extension header, a TCP header, and data. The application information 1 may be carried in the IP extension header. The IP extension header mentioned herein may be, for example, an IPV6 extension header. The AH verification algorithm 2 mentioned herein may be, for example, HMAC MD5 or HMAC SHA1.

When the verification algorithm 1 is the ESP-based integrity verification, and the packet 1 may be encapsulated in tunnel mode, in an implementation, the communication apparatus 1 may perform calculation on a field 5 in the packet 1 by using an ESP verification algorithm 1 to obtain ESP verification information 1, that is, obtain the verification information 1. It can be learned from FIG. 4D that the field 5 includes an ESP header, an IP header, an IP extension header, a TCP header, data, and an ESP tail. The application information 1 may be carried in the IP extension header. The IP extension header mentioned herein may be, for example, an IPV6 extension header. The ESP verification algorithm 1 mentioned herein may be, for example, HMAC MD5 or HMAC SHA1.

In an implementation, the packet 1 mentioned herein may be an IPV6 packet.

When the packet 1 is the IPV6 packet, in some embodiments, the application information 1 may be carried in an extension header of the IPV6 packet. The extension header of the IPV6 packet may be a hop-by-hop option extension header, the extension header of the IPV6 packet may be a destination option extension header, and the extension header of the IPV6 packet may be a routing extension header. In some other embodiments, the application information 1 may alternatively be carried in a source address field or a destination address field of the packet 1. For an IPV6 packet, a source address and a destination address of the IPV6 packet include 128 bits, and the 128 bits may include three fields: locator, function, and arguments. The locator field is for carrying a network segment address and a subnet address. Both the function field and the arguments field are for carrying a behavior corresponding to the locator. In some embodiments, the application information 1 may be carried in the function field or the arguments field of the source address field. In some embodiments, the application information 1 may be carried in the function field or the arguments field of the destination address field.

Similar to the application information 1, when the packet 1 is an IPV6 packet, in some embodiments, the verification information 1 may be carried in an extension header of the IPV6 packet. In some other embodiments, the verification information 1 may be carried in a source address field or a destination address field of the IPV6 packet. It should be noted that, in this embodiment of the present disclosure, the application information 1 and the verification information 1 may be carried in a same field of an IPV6 packet or may be carried in different fields. This not specifically limited in this embodiment of the present disclosure. For example, both the application information 1 and the verification information 1 are carried in the source address field. The application information 1 is carried in the function field of the source address, and the verification information 1 is carried in the arguments field of the source address. For another example, the application information 1 is carried in the source address field, and the verification information 1 is carried in the destination address field.

For a structure of the IPV6 packet and meanings of fields, refer to related descriptions of the request for comments (RFC) 8200. Details are not described herein.

In an implementation, the packet 1 may be a MPLS packet.

When the packet 1 is the MPLS packet, for example, the application information 1 may be carried in a packet header of the MPLS packet. In an example, the application information 1 may be carried in a label stack in the packet header, for example, carried in a label value field. In another example, the application information 1 may be carried in an extension TLV field of the MPLS packet.

When the packet 1 is the MPLS packet, similar to the application information 1, the verification information 1 may also be carried in the packet header of the MPLS packet. In an example, the verification information 1 may be carried in the label stack in the packet header, for example, carried in the label value field. In another example, the verification information 1 may be carried in the extension TLV field of the MPLS packet.

For a structure of the MPLS packet and meanings of fields, refer to related descriptions in draft-song-mpls-extension-header-2 and RFC 3031. Details are not described herein.

In an implementation, the packet 1 may be a SRv6packet.

When the packet 1 is the SRv6 packet, for example, the application information 1 may be carried in a packet header of the SRv6 packet. In an example, the application information 1 may be carried in a SRH of the SRv6 packet. In some embodiments, the application information 1 may be carried in a source address field of the SRH. In some other embodiments, the application information 1 may be carried in a destination address field of the SRH. In some other embodiments, the application information 1 may be further carried in a segment identifier (SID) list.

When the packet 1 is the SRv6 packet, similar to the application information 1, the verification information 1 may also be carried in the packet header of the SRv6 packet. In an example, the verification information 1 may be carried in the SRH of the SRv6 packet. In some embodiments, the verification information 1 may be carried in the source address field of the SRH. In some other embodiments, the verification information 1 may be carried in the destination address field of the SRH. In some other embodiments, the verification information 1 may be further carried in the SID list.

For a structure of the SRv6 packet and meanings of fields, refer to related descriptions in RFC 8200. Details are not described herein.

In an implementation, the packet 1 may be an IPV4packet.

When the packet 1 is the IPV4 packet, for example, the application information 1 may be carried in an option field of the IPV4 packet. Similar to the application information 1, the verification information 1 may also be carried in the option field of the IPV4 packet.

A structure of the IPv4 packet and meanings of fields are not described in detail herein.

In an implementation, the packet 1 may be a GRE packet.

When the packet 1 is the GRE packet, the application information 1 may be carried in a packet header of the GRE packet. In an example, the application information 1 may be carried in a key field in the packet header. Similar to the application information 1, the verification information 1 may also be carried in the key field of the GRE packet.

For a structure of the GRE packet and meanings of fields, refer to related descriptions in RFC 2890. Details are not described herein.

In an implementation, the packet 1 may be a VXLAN packet.

When the packet 1 is the VXLAN packet, the application information 1 may be carried in a packet header of the VXLAN packet. In an example, the application information 1 may be carried in a reserved field in the packet header. In another example, the application information 1 may be carried in a virtual network identifier (VNI) field in the packet header. When the application information 1 is carried in the VNI field, the VNI field may be divided into a plurality of parts. One part is for carrying the VNI, and another part is for carrying the application information 1.

When the packet 1 is the VXLAN packet, similar to the application information 1, the verification information 1 may be carried in the packet header of the VXLAN packet. For example, the verification information 1 may be carried in the reserved field in the packet header. In another example, the verification information 1 may be carried in the VNI field in the packet header. When the verification information 1 is carried in the VNI field, the VNI field may be divided into a plurality of parts. One part is for carrying the VNI, and another part is for carrying the verification information 1.

For a structure of the VXLAN packet and meanings of fields, refer to related descriptions in RFC 7348. Details are not described herein.

In an implementation, the packet 1 may be a NVGRE packet.

When the packet 1 is the NVGRE packet, the application information 1 may be carried in a packet header of the NVGRE packet. In an example, the application information 1 may be carried in a reserved field in the packet header. In another example, the application information 1 may be carried in a VNI field in the packet header. When the application information 1 is carried in the VNI field, the VNI field may be divided into a plurality of parts. One part is for carrying the VNI, and another part is for carrying the application information 1. In another example, the application information 1 may be carried in a flow ID field in the packet header. When the application information 1 is carried in the flow ID field, the flow ID field may be divided into a plurality of parts. One part is for carrying the flow ID, and another part is for carrying the application information 1.

When the packet 1 is the VXLAN packet, similar to the application information 1, the verification information 1 may be carried in the packet header of the NVGRE packet. For example, the verification information 1 may be carried in the reserved field in the packet header. In another example, the verification information 1 may be carried in the VNI field in the packet header. When the verification information 1 is carried in the VNI field, the VNI field may be divided into a plurality of parts. One part is for carrying the VNI, and another part is for carrying the verification information 1. In another example, the verification information 1 may be carried in the flow ID field in the packet header. When the verification information 1 is carried in the flow ID field, the flow ID field may be divided into a plurality of parts. One part is for carrying the flow ID, and another part is for carrying the verification information 1.

For a structure of the NVGRE packet and meanings of fields, refer to related descriptions in RFC 7637. Details are not described herein.

In an implementation, the packet 1 may be a Geneve packet.

When the packet 1 is the Geneve packet, the application information 1 may be carried in a packet header of the Geneve packet. In an example, the application information 1 may be carried in a reserved field in the packet header. In another example, the application information 1 may be carried in a variable length options field in the packet header.

When the packet 1 is the Geneve packet, similar to the application information 1, the verification information 1 may be carried in the packet header of the Geneve packet. In an example, the verification information 1 may be carried in the reserved field in the packet header. In another example, the verification information 1 may be carried in the variable length options field in the packet header.

For a structure of the Geneve packet and meanings of fields, refer to related descriptions of draft-ietf-nvo3-geneve-16. Details are not described herein.

S102: The communication apparatus 1 sends the packet 1 to the communication apparatus 2.

S103: The communication apparatus 2 receives the packet 1.

S104: The communication apparatus 2 verifies the integrity of the application information 1 based on the verification information 1.

After the communication apparatus 2 receives the packet 1, because the packet 1 carries the application information 1, the communication apparatus 2 should determine a corresponding network resource for the packet 1 based on the application information 1. In this embodiment of the present disclosure, to avoid improper use of the application information 1, after receiving the packet 1, the communication apparatus 2 may verify the integrity of the application information 1 based on the verification information 1, to avoid improper use of the network resource.

In this embodiment of the present disclosure, during specific implementation of S104, the communication apparatus 2 may perform calculation on, for example, a field in the packet 1, to obtain verification information 2, and perform matching verification on the verification information 1 and the verification information 2. In an example, matching verification is performed on the verification information 1 and the verification information 2. To be specific, the verification information 1 is compared with the verification information 2. If the verification information 1 is the same as the verification information 2, the matching verification succeeds; or if the verification information 1 is different from the verification information 2, the matching verification fails. In an implementation of this embodiment of the present disclosure, the communication apparatus 2 performs calculation on the field in the packet 1, for example, may perform calculation on the field in the packet 1 by using the verification algorithm 1. The field in the packet 1 includes the application information 1.

As described above, the verification algorithm 1 may be the HMAC verification.

When the verification algorithm 1 is the HMAC verification, an implementation of S104 is as follows: The communication apparatus 2 may append the key 1 to the field 1 as an input of the hash algorithm 1, to obtain the verification information 2. Then, matching verification is performed on the verification information 1 and the verification information 2. The key 1 may be pre-negotiated by the communication apparatus 2 and the communication apparatus 1. The hash algorithm 1 may also be pre-negotiated by the communication apparatus 2 and the communication apparatus 1. For the field 1, refer to the related descriptions in S101.

In this embodiment of the present disclosure, the key 1 and the hash algorithm 1 may be pre-negotiated by the communication apparatus 1 and the communication apparatus 2, or pre-negotiated by an APP 1 on the communication apparatus 1 and the communication apparatus 2. However, another APP on the communication apparatus 1 cannot obtain the key 1 and the hash algorithm 1, and an APP installed on a second device cannot obtain the key 1 and the hash algorithm 1, either. Therefore, even if another APP on the communication apparatus 1 or an APP on a second device embezzles the application information 1, because the second APP on the communication apparatus 1 or the APP on the second device cannot obtain the key 1 and the hash algorithm 1, the second APP on the communication apparatus 1 or the APP on the second device cannot generate the verification information 1. Correspondingly, a packet a generated by the APP that embezzles the application information 1 does not include the verification information 1. Therefore, when the communication apparatus 2 receives the packet a, integrity verification performed on the application information 1 fails, so that embezzlement of the network resource caused by embezzlement of the application information 1 can be avoided.

When the verification algorithm 1 is the HMAC verification, another implementation of S104 is as follows: The communication apparatus 2 obtains a parameter 1 and a parameter 2. The communication apparatus 2 pads a value to the head or the tail of the key 2 in a value padding manner agreed upon with the communication apparatus 1, for example, pads 0, so that the key 2 obtained through value padding and the parameter 1 have a same quantity of bits. The communication apparatus 2 performs calculation on the key 2 obtained through value padding and the parameter 1 by using a calculation manner agreed upon by the communication apparatus 2 and the communication apparatus 1, for example, performs exclusive OR calculation to obtain a key 2'. Then, the communication apparatus 2 appends the key 2' to the field 1 as an input of the hash algorithm 2, to obtain HMAC 1'. The communication apparatus 2 performs calculation on the key 2 obtained through value padding and the parameter 2 by using a calculation manner agreed upon by the communication apparatus 2 and the communication apparatus 1, for example, performs exclusive OR calculation to obtain a key 2". Then, the communication apparatus 2 appends the key 2" to HMAC 1' as an input of the hash algorithm 2 to obtain HMAC 2', that is, obtain the verification information 2. After the verification information 2 is calculated, the communication apparatus 2 may perform matching verification on the verification information 1 and the verification information 2. The parameter 1, the parameter 2, the key 2, and the hash algorithm 2 may all be pre-negotiated by the communication apparatus 1 and the communication apparatus 2.

In this embodiment of the present disclosure, the parameter 1, the parameter 2, the key 2, and the hash algorithm 2 may be pre-negotiated by the communication apparatus 1 and the communication apparatus 2 or may be pre-negotiated by the APP 1 on the communication apparatus 1 and the communication apparatus 2. However, another APP on the communication apparatus 1 cannot obtain the parameter 1, the parameter 2, the key 2, and the hash algorithm 2, and an APP installed on a second device cannot obtain the parameter 1, the parameter 2, the key 2, and the hash algorithm 2, either. Therefore, even if another APP on the communication apparatus 1 or an APP on a second device embezzles the application information 1, because the APP cannot obtain the parameter 1, the parameter 2, the key 2, and the hash algorithm 2, the APP cannot generate the verification information 1. Correspondingly, a packet b generated by the APP that embezzles the application information 1 does not include the verification information 1. Therefore, when the communication apparatus 2 receives the packet b, integrity verification performed on the application information 1 fails, so that embezzlement of the network resource caused by embezzlement of the application information 1 can be avoided.

As described above, the verification algorithm 1 may be the digital signature verification.

When the verification algorithm 1 is the digital signature verification, an implementation of S104 is as follows: For example, the communication apparatus 2 may perform a hash operation on the field 2 in the packet 1 by using the hash algorithm 3, to obtain a hash digest 1'. The communication apparatus 2 decrypts the digital signature 1 by using the public key 1 and the decryption algorithm 1, to obtain a hash digest 1". Then, the communication apparatus 2 performs matching verification on the hash digest 1' and the hash digest 1".

In some embodiments, the public key 1 may be pre-negotiated by the communication apparatus 2 and the communication apparatus 1, and the decryption algorithm 1 and the hash algorithm 3 may be pre-negotiated by the communication apparatus 2 and the communication apparatus 1. In some other embodiments, the public key 1 may be carried in the packet 1. For example, as described above, the packet 1 includes the digital certificate 1, and the digital certificate 1 carries the public key 1. In addition, the decryption algorithm 1 and the hash algorithm 3 may be carried in the packet 1, for example, carried in the digital certificate 1.

In this embodiment of the present disclosure, the public key 1, the decryption algorithm 1, and the hash algorithm 3 may be pre-negotiated by the communication apparatus 1 and the communication apparatus 2 or may be pre-negotiated by the APP 1 on the communication apparatus 1 and the communication apparatus 2. However, another APP on the communication apparatus 1 cannot obtain the public key 1, the decryption algorithm 1, and the hash algorithm 3, and an APP installed on a second device cannot obtain the public key 1, the decryption algorithm 1, and the hash algorithm 3, either. Therefore, even if the second APP on the communication apparatus 1 or the APP on the second device embezzles the application information 1, because the second APP on the communication apparatus 1 or the APP on the second device cannot obtain the public key 1, the decryption algorithm 1, and the hash algorithm 3, the second APP on the communication apparatus 1 or the APP on the second device cannot generate the verification information 1. Correspondingly, a packet c generated by the APP that embezzles the application information 1 does not include the verification information 1. Therefore, when the communication apparatus 2 receives the packet c, integrity verification performed on the application information 1 fails, so that embezzlement of the network resource caused by embezzlement of the application information 1 can be avoided.

In an implementation of this embodiment of the present disclosure, if the packet 1 includes the digital certificate 1 of the communication apparatus 1, the communication apparatus 2 may further verify validity of the digital certificate. If the digital certificate 1 passes the verification, it indicates that the packet 1 is from a trusted sender. In addition, if the public key 1 is carried in the digital certificate 1 and the digital certificate 1 passes the verification, the validity of the public key 1 is also ensured. Similarly, if the decryption algorithm 1 and the hash algorithm 3 are carried in the digital certificate 1, and if the digital certificate 1 passes the verification, validity of the decryption algorithm 1 and the hash algorithm 3 is also ensured.

In addition, as described above, the digital certificate 1 includes identity information of the communication apparatus 1. When the identity information of the communication apparatus 1 includes the application information 1, the application information 1 in the packet 1 may be carried in the digital certificate 1. In this case, if the digital certificate 1 passes the verification, validity of the application information 1 in the digital certificate 1 is also ensured, thereby implementing multiple verifications on the application information 1.

In another implementation of this embodiment of the present disclosure, if the packet 1 includes the digital certificate 1, and the digital certificate 1 includes the application information 1 and the verification information 1, during specific implementation of S104, the validity of the digital certificate 1 may be directly verified. Provided that the digital certificate 1 is valid, it indicates that the verification information 1 and the application information 1 are valid. When verifying the validity of the digital certificate, for example, a hash algorithm 4 may be used to perform hash calculation on the untrusted digital certificate mentioned in S101 to obtain a hash digest 2', and a public key 2 of the CA authority is used to decrypt an encrypted digest 1 in the digital certificate to obtain a hash digest 2". Then, matching verification is performed on the hash digest 2' and the hash digest 2". If the two are the same, it is determined that the digital certificate 1 is valid; otherwise, it is determined that the digital certificate 1 is invalid. Certainly, when the digital certificate 1 is verified, identity authentication may be further performed on the CA authentication authority. For a specific implementation of performing identity authentication on the CA authentication authority, refer to a conventional authentication manner. Details are not described herein.

As described above, the verification algorithm 1 may be the IPsec-based integrity verification.

When the verification algorithm 1 is AH-based integrity verification, and the packet 1 is encapsulated in transport mode, an implementation of S104 is as follows: The communication apparatus 2 performs calculation on a field 3 in the packet 1 by using an AH verification algorithm 1, to obtain AH verification information 3, that is, obtain the verification information 2. Then, the communication apparatus 2 performs matching verification on the verification information 1 and the verification information 2. The matching verification performed on the verification information 1 and the verification information 2 is matching verification performed on the AH verification information 1 verification information mentioned in S101 and the AH verification information 3. It should be noted that the AH verification algorithm 1 mentioned herein may be agreed on by the communication apparatus 1 and the communication apparatus 2 in advance. For the field 3, refer to the descriptions of the field 3 in S101.

In this embodiment of the present disclosure, the AH verification algorithm 1 may be pre-negotiated by the communication apparatus 1 and the communication apparatus 2, or pre-negotiated by the APP 1 on the communication apparatus 1 and the communication apparatus 2. However, a second APP on the communication apparatus 1 cannot obtain the AH verification algorithm 1, and an APP installed on a second device cannot obtain the AH verification algorithm 1, either. Therefore, even if the second APP on the communication apparatus 1 or an APP on a second device embezzles the application information 1, because the second APP on the communication apparatus 1 or the APP on the second device cannot obtain the AH verification algorithm 1, the second APP on the communication apparatus 1 or the APP on the second device cannot generate the verification information 1. Correspondingly, a packet d generated by the APP that embezzles the application information 1 does not include the verification information 1. Therefore, when the communication apparatus 2 receives the packet d, integrity verification performed on the application information 1 fails, so that embezzlement of the network resource caused by embezzlement of the application information 1 can be avoided.

When the verification algorithm 1 is AH-based integrity verification, and the packet 1 is encapsulated in tunnel mode, an implementation of S104 is as follows: The communication apparatus 2 performs calculation on a field 4 in the packet 1 by using an AH verification algorithm 2, to obtain AH verification information 4, that is, obtain the verification information 2. Then, the communication apparatus 2 performs matching verification on the verification information 1 and the verification information 2. The matching verification performed on the verification information 1 and the verification information 2 is matching verification performed on AH verification information 2 verification information mentioned in S101 and the AH verification information 4. It should be noted that the AH verification algorithm 2 mentioned herein may be agreed on by the communication apparatus 1 and the communication apparatus 2 in advance. For the field 4, refer to the descriptions of the field 4 in S101.

In this embodiment of the present disclosure, the AH verification algorithm 2 may be pre-negotiated by the communication apparatus 1 and the communication apparatus 2, or pre-negotiated by the APP 1 on the communication apparatus 1 and the communication apparatus 2.

However, another APP on the communication apparatus 1 cannot obtain the AH verification algorithm 2, and an APP installed on a second device cannot obtain the AH verification algorithm 2, either. Therefore, even if the second APP on the communication apparatus 1 or the APP on the second device embezzles the application information 1, because the second APP on the communication apparatus 1 or the APP on the second device cannot obtain the AH verification algorithm 2, the second APP on the communication apparatus 1 or the APP on the second device cannot generate the verification information 1. Correspondingly, a packet e generated by the APP that embezzles the application information 1 does not include the verification information 1. Therefore, when the communication apparatus 2 receives the packet e, integrity verification performed on the application information 1 fails, so that embezzlement of the network resource caused by embezzlement of the application information 1 can be avoided.

When the verification algorithm 1 is the ESP-based integrity verification, an implementation of S104 is as follows: The communication apparatus 2 may perform calculation on a field 5 in the packet 1 by using an ESP verification algorithm 1, to obtain ESP verification information 2, that is, obtain the verification information 2. Then, the communication apparatus 2 performs matching verification on the verification information 1 and the verification information 2. The matching verification performed on the verification information 1 and the verification information 2 is matching verification performed on the ESP verification information 1 verification information mentioned in S101 and the ESP verification information 2. It should be noted that the ESP verification algorithm 1 mentioned herein may be agreed on by the communication apparatus 1 and the communication apparatus 2 in advance. For the field 5, refer to the descriptions of the field 5 in S101.

In this embodiment of the present disclosure, the ESP verification algorithm 1 may be pre-negotiated by the communication apparatus 1 and the communication apparatus 2, or pre-negotiated by the APP 1 on the communication apparatus 1 and the communication apparatus 2. However, another APP on the communication apparatus 1 cannot obtain the ESP verification algorithm 1, and an APP installed on a second device cannot obtain the ESP verification algorithm 1, either. Therefore, even if the second APP on the communication apparatus 1 or the APP on the second device embezzles the application information 1, because the second APP on the communication apparatus 1 or the APP on the second device cannot obtain the ESP verification algorithm 1, the second APP on the communication apparatus 1 or the APP on the second device cannot generate the verification information 1. Correspondingly, a packet f generated by the APP that embezzles the application information 1 does not include the verification information 1. Therefore, when the communication apparatus 2 receives the packet f, integrity verification performed on the application information 1 fails, so that embezzlement of the network resource caused by embezzlement of the application information 1 can be avoided.

S105a: The communication apparatus 2 sends the packet 1 to the communication apparatus 3 when the application information 1 passes the verification.

S105b: The communication apparatus 2 discards the packet 1 when the application information 1 fails the verification.

In this embodiment of the present disclosure, after the communication apparatus 2 verifies the integrity of the application information 1, if the application information 1 passes the verification, it indicates that the application information in the packet 1 is valid. Therefore, the communication apparatus 2 may send the packet 1 to the server 102. In some embodiments, the communication apparatus 2 may determine, based on the application information 1, a network resource corresponding to the packet 1, and further forward the packet 1 to the server 102 by using the determined network resource.

In an implementation of this embodiment of the present disclosure, if the application information 1 fails the verification, it indicates that the application information in the packet 1 may be obtained illegally. Therefore, the communication apparatus 2 may discard the packet 1, to avoid illegal embezzlement of the network resource corresponding to the application information 1.

In an implementation of this embodiment of the present disclosure, the packet 1 may include one or more pieces of verification information for verifying the integrity of the application information 1. Correspondingly, in addition to verifying the integrity of the application information 1 based on the verification information 1, the communication apparatus 2 may further verify the integrity of the application information 1 based on other verification information. In other words, in this embodiment of the present disclosure, the packet 1 may further include verification information 3 in addition to the verification information 1. The verification information 3 may be obtained by the communication apparatus 1 by performing calculation on a field in the packet 1. In an example, the verification information 3 may be obtained by performing calculation on the field in the packet 1 by using a verification algorithm 2.

The verification algorithm 2 is different from the verification algorithm 1. However, similar to the verification algorithm 1, the verification algorithm 2 may also be one of the HMAC algorithm, the digital signature algorithm, and the IPsec-based integrity verification. For the verification algorithm 2, refer to the foregoing descriptions of the verification algorithm 1. For a specific implementation in which the communication apparatus 1 obtains the verification information 3 by using the verification algorithm 2, refer to the foregoing description in which the communication apparatus 1 obtains the verification information 1 based on the verification algorithm 1. Correspondingly, for a specific implementation in which the communication apparatus 2 verifies the integrity of the application information 1 by using the verification information 3, refer to the foregoing specific descriptions of S104.

FIG. 5 is a signaling interaction diagram of an application information verification method according to an embodiment of the present disclosure.

The application information verification method 200 shown in FIG. 5 may be executed by the communication apparatus 1 and the communication apparatus 2 shown in FIG. 1. For a communication apparatus 1, a communication apparatus 2, and a communication apparatus 3 in the method 200, refer to the descriptions of the communication apparatus 1, the communication apparatus 2, and the communication apparatus 3 in the method 100. The method 200 may be implemented, for example, by performing the following steps S201 to S203.

S201: The communication apparatus 1 obtains a packet 1, where the packet 1 includes a digital certificate 1, and the digital certificate 1 includes application information 1 and verification information 1.

In this embodiment of the present disclosure, the communication apparatus 1 may first send the application information 1 to a control management device, and then obtain, from the control management device, the digital certificate 1 including the application information 1 and the verification information 1. In an embodiment, the control management device may perform hash calculation on the application information 1 by using a hash algorithm 1, to obtain a hash digest 1. Then, the control management device encrypts the hash digest 1 by using a private key 1 of the control management device, to obtain the verification information 1.

The verification information 1 is an encrypted digest of the hash digest 1. In addition to including the application information 1 and the verification information 1, the digital certificate 1 mentioned herein may further include identity information of the control management device and a public key 1 corresponding to the private key 1. The identity information of the control management device is not limited herein.

After obtaining the digital certificate 1 from the control management device, the communication apparatus 1 may generate the packet 1 including the digital certificate 1.

In this embodiment of the present disclosure, in an implementation, the packet 1 mentioned herein may be an IPV6 packet.

When the packet 1 is the IPV6 packet, in some embodiments, the digital certificate 1 may be carried in an extension header of the IPV6 packet. In some other embodiments, the digital certificate 1 may be carried in a source address field or a destination address field of the IPV6 packet.

In an implementation, the packet 1 may be an MPLS packet.

When the packet 1 is the MPLS packet, for example, the digital certificate 1 may be carried in a packet header of the MPLS packet. In an example, the digital certificate 1 may be carried in a label stack in the packet header, for example, carried in a label value field. In another example, the digital certificate 1 may be carried in an extension TLV field of the MPLS packet.

In an implementation, the packet 1 may be an SRv6 packet.

When the packet 1 is the SRv6 packet, for example, the digital certificate 1 may be carried in a packet header of the SRv6 packet. In an example, the digital certificate 1 may be carried in an SRH of the SRv6 packet. In some embodiments, the digital certificate 1 may be carried in a source address field of the SRH. In some other embodiments, the digital certificate 1 may be carried in a destination address field of the SRH. In some other embodiments, the digital certificate 1 may further be carried in a SID list.

In an implementation, the packet 1 may be an IPV4 packet.

When the packet 1 is the IPV4 packet, for example, the digital certificate 1 may be carried in an option field of the IPV4 packet.

In an implementation, the packet 1 may be a GRE packet.

When the packet 1 is the GRE packet, the digital certificate 1 may be carried in a packet header of the GRE packet. In an example, the digital certificate 1 may be carried in a key field in the packet header.

In an implementation, the packet 1 may be a VXLAN packet.

When the packet 1 is the VXLAN packet, the digital certificate 1 may be carried in a packet header of the VXLAN packet. In an example, the digital certificate 1 may be carried in a reserved field in the packet header. In another example, the digital certificate 1 may be carried in a VNI field in the packet header.

In an implementation, the packet 1 may be an NVGRE packet.

When the packet 1 is the NVGRE packet, the digital certificate 1 may be carried in a packet header of the NVGRE packet. In an example, the digital certificate 1 may be carried in a reserved field in the packet header. In another example, the digital certificate 1 may be carried in a VNI field in the packet header. In another example, the digital certificate 1 may be carried in a flow ID field in the packet header.

In an implementation, the packet 1 may be a Geneve packet.

When the packet 1 is the Geneve packet, the digital certificate 1 may be carried in a packet header of the Geneve packet. In an example, the digital certificate 1 may be carried in a reserved field in the packet header. In another example, the digital certificate 1 may be carried in a variable length options field in the packet header.

S202: The communication apparatus 1 sends the packet 1 to the communication apparatus 2.

S203: The communication apparatus 2 receives the packet 1.

S204: The communication apparatus 2 verifies validity of the digital certificate 1.

After receiving the packet 1, the communication apparatus 2 may verify the validity of the digital certificate 1. The digital certificate 1 includes the application information 1 and the verification information 1. Therefore, if the digital certificate 1 is valid, it indicates that validity of the verification information 1 and validity of the application information 1 are verified. For a specific implementation in which the communication apparatus 2 verifies the digital certificate 1, refer to the foregoing descriptions in which the communication apparatus 2 verifies the validity of the digital certificate 1.

S205a: The communication apparatus 2 forwards the packet 1 to the communication apparatus 3 when the digital certificate 1 passes the verification.

S205b: The communication apparatus 2 discards the packet 1 when the digital certificate 1 fails the verification.

In this embodiment of the present disclosure, after the communication apparatus 2 verifies the validity of the digital certificate 2, if the digital certificate 1 passes the verification, it indicates that the application information 1 in the packet 1 is valid. Therefore, the communication apparatus 2 may send the packet 1 to the communication apparatus 3. In some embodiments, the communication apparatus 2 may determine, based on the application information 1, a network resource corresponding to the packet 1, and further forward the packet 1 to the communication apparatus 3 by using the determined network resource.

In an implementation of this embodiment of the present disclosure, if the digital certificate 1 fails the verification, it indicates that the application information 1 in the packet 1 may be obtained illegally. Therefore, the communication apparatus 2 may discard the packet 1, to avoid illegal embezzlement of the network resource corresponding to the application information 1.

In an implementation of this embodiment of the present disclosure, in addition to including the verification information 1, the packet 1 may further include verification information 2 for verifying the integrity of the application information 1. The verification information 2 is similar to the verification information 1 in the foregoing method 100. Therefore, details are not described herein again.

Correspondingly, in addition to verifying the validity of the digital certificate 1, the communication apparatus 2 may further verify the integrity of the application information 1 by using the verification information 2. For a specific implementation in which the communication apparatus 2 verifies the application information 1 by using the verification information 2, refer to the specific implementations of S104.

As can be known from the descriptions of the verification information 1 in the method 100, the verification information 1 may be obtained by performing calculation on a field in the packet 1 by using a digital signature algorithm.

Therefore, in an implementation, the verification information 2 in the method 200 may be obtained by performing calculation on the field in the packet 1 by using the digital signature algorithm. The field in the packet 1 includes the application information 1. In this case, the communication apparatus 1 may perform digital signature on the field in the packet 1 by using a private key 2 and a hash algorithm 2, and determine an obtained digital signature 1 as the verification information 2. In an example, the communication apparatus 1 may perform hash calculation on the application information 1 in the packet 1 by using the hash algorithm 2, to obtain a hash digest 1, and encrypt the hash digest 1 by using the private key 2 and the encryption algorithm 1, to obtain the digital signature 1. Correspondingly, the communication apparatus 2 may decrypt the verification information 2 by using a decryption algorithm 1 and a public key 2 corresponding to the private key 2, to obtain a hash digest 1'. The communication apparatus 2 may further perform hash calculation on the application information 1 in the packet 1 by using the hash algorithm 2, to obtain a hash digest 1'', and perform matching verification on the hash digest 1' and the hash digest 1''. The decryption algorithm 1 is an inverse operation of an encryption algorithm 1 and is for decrypting data encrypted by using the encryption algorithm 1.

In an implementation of this embodiment of the present disclosure, if the verification information 2 may be obtained by performing calculation on the field in the packet 1 by using the digital signature algorithm, the public key 2 mentioned above may be carried in the digital certificate 1 mentioned in S201. The decryption algorithm 1 and the hash algorithm 2 may alternatively be carried in the digital certificate 1 mentioned in S201.

Figure 6:
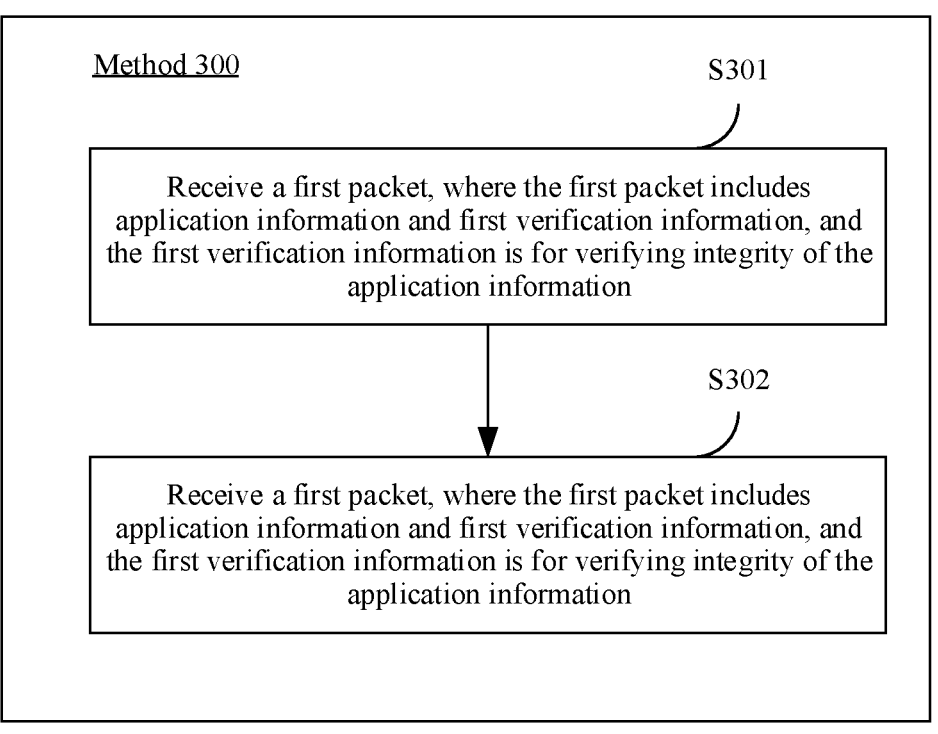
FIG. 6 is a schematic flowchart of an application information verification method according to an embodiment of the present disclosure.

An embodiment of the present disclosure further provides an application information verification method 300. FIG. 6 is a schematic flowchart of an application information verification method according to an embodiment of the present disclosure.

The method 300 shown in FIG. 6 may be performed by a first communication apparatus, and the first communication apparatus may be, for example, the communication apparatus 1 mentioned in the foregoing embodiment. The method 300 shown in FIG. 6 may be applied to the method 100 mentioned in the foregoing embodiment. In the method 300, steps performed by the communication apparatus 1 in the foregoing method 100 are performed. For example, the method 300 may include the following steps S301 and S302.

S301: Receive a first packet, where the first packet includes application information and first verification information, and the first verification information is for verifying integrity of the application information.

S302: Verify the integrity of the application information based on the first verification information.

The first packet in the method 300 may correspond to the packet 1 in the method 100; the application information in the method 300 may correspond to the application information 1 in the method 100; the first verification information in the method 300 may correspond to the verification information 1 in the method 100.

In an implementation, the verifying the integrity of the application information based on the first verification information includes obtaining second verification information based on a target field in the first packet, where the target field includes the application information; and performing matching verification on the second verification information and the first verification information.

The target field in the method 300 may correspond to the field 1, the field 2, the field 3, the field 4, or the field 5 in the method 100. The second verification information in the method 300 may correspond to the verification information 2 in the method 100.

In an implementation, the verifying the integrity of the application information based on the first verification information includes verifying the integrity of the application information based on a first verification method and the first verification information.

The first verification method in the method 300 may correspond to the verification algorithm 1 in the method 100.

In an implementation, the first verification method is HMAC verification.

In an implementation, the first verification information includes first HMAC verification information, and the verifying the integrity of the application information based on a first verification method and the first verification information includes performing HMAC calculation on the target field in the first packet to obtain second HMAC verification information; and performing matching verification on the first HMAC verification information and the second HMAC verification information.

When the first verification method is the HMAC verification, the target field in the method 300 corresponds to the field 1 in the method 100.

In an implementation, the first HMAC verification information in the method 300 may correspond to the verification information 1 obtained by appending the key 1 to the field 1 as an input of the hash algorithm 1 in the method 100. Correspondingly, the second HMAC verification information may correspond to the verification information 2 obtained by appending the key 1 to the field 1 as an input of the hash algorithm 1 in the method 100.

In an implementation, the first HMAC verification information in the method 300 may correspond to the HMAC 2 in the method 100, and correspondingly the second HMAC verification information may correspond to the HMAC 2' in the method 100.

In an implementation, the first verification method is digital signature verification.

In an implementation, the first verification information is a digital signature obtained by signing the target field in the first packet through a first private key and first hash calculation, and the verifying the integrity of the application information based on a first verification method and the first verification information includes decrypting the digital signature by using a first public key to obtain a first plaintext; performing second hash calculation on the target field to obtain a second plaintext, where the first hash calculation and the second hash calculation use a same hash algorithm; and performing matching verification on the first plaintext and the second plaintext.

When the first verification method is the digital signature, the target field corresponds to the field 2 in the method 100, the first private key corresponds to the private key 1 in the method 100, the first hash calculation corresponds to the hash algorithm 3 in the method 100, the digital signature corresponds to the digital signature 1 in the method 100, the first public key corresponds to the public key 1 in the method 100, the first plaintext corresponds to the hash digest 1" in the method 100, the second hash calculation corresponds to the hash algorithm 3 in the method 100, and the second plaintext may correspond to the hash digest 1' in the method 100.

In an implementation, the first packet further includes a digital certificate, and the digital certificate includes the first public key.

The digital certificate in the method 300 corresponds to the digital certificate 1 in the method 100, and the first public key corresponds to the public key 1 in the method 100.

In an implementation, the digital certificate further includes a decryption algorithm for decrypting the digital signature, and/or the hash algorithm.

The decryption algorithm mentioned herein may correspond to the decryption algorithm 1 in the method 100, and the hash algorithm mentioned herein may correspond to the hash algorithm 3 in the method 100.

In an implementation, the method further includes verifying validity of the digital certificate.

In an implementation, the first packet includes a digital certificate, and the application information and the first verification information are carried in the digital certificate.

In an implementation, the verifying the integrity of the application information based on the first verification information includes verifying validity of the digital certificate.

In an implementation, the first verification method is IPsec-based integrity verification.

When the first verification method is the IPsec-based integrity verification, the first verification method may be AH verification or ESP verification.

In an implementation, the first verification information is first AH verification information, and the verifying the integrity of the application information based on a first verification method and the first verification information includes performing calculation on the target field in the first packet by using an AH verification algorithm, to obtain second AH verification information; and performing matching verification on the first AH verification information and the second AH verification information.

When the first verification method is the AH verification, the first verification information is the first AH verification information, and the second verification information is the second AH verification information. The first AH verification information may correspond to the AH verification information 1 or the AH verification information 2 in the method 100, and the second AH verification information may correspond to the AH verification information 3 or the AH verification information 4 in the method 100.

In an example, when the first packet is encapsulated in transport mode, the first AH verification information corresponds to the AH verification information 1 in the method 100, the second verification information corresponds to the AH verification information 3 in the method 100, and the target field may correspond to the field 3 in the method 100. When the first packet is encapsulated in tunnel mode, the first AH verification information corresponds to the AH verification information 2 in the method 100, the second verification information corresponds to the AH verification information 4 in the method 100, and the target field may correspond to the field 4 in the method 100.

In an implementation, the first verification information is first ESP verification information, and the verifying the integrity of the application information based on a first verification method and the first verification information includes performing calculation on the target field in the first packet by using an ESP verification algorithm, to obtain second ESP verification information; and performing matching verification on the first ESP verification information and the second ESP verification information.

When the first verification method is the ESP verification, the first verification information is the first ESP verification information, and the second verification information is the second ESP verification information. The first ESP verification information may correspond to the ESP verification information 1 in the method 100, the second ESP verification information may correspond to the ESP verification information 2 in the method 100, and the target field may correspond to the field 5 in the method 100.

In an implementation, the first communication apparatus is a network device.

In an implementation, the first communication apparatus includes an ACC device, a CPE device, an RG, a data center server access leaf device, a DC GW, an ASBR, a base station, a UPF device, a BNG, or a PE device.

In an implementation, the method further includes forwarding the first packet when it is determined that the application information passes the verification.

In an implementation, the method further includes discarding the first packet when it is determined that the application information fails the verification.

Figure 7:
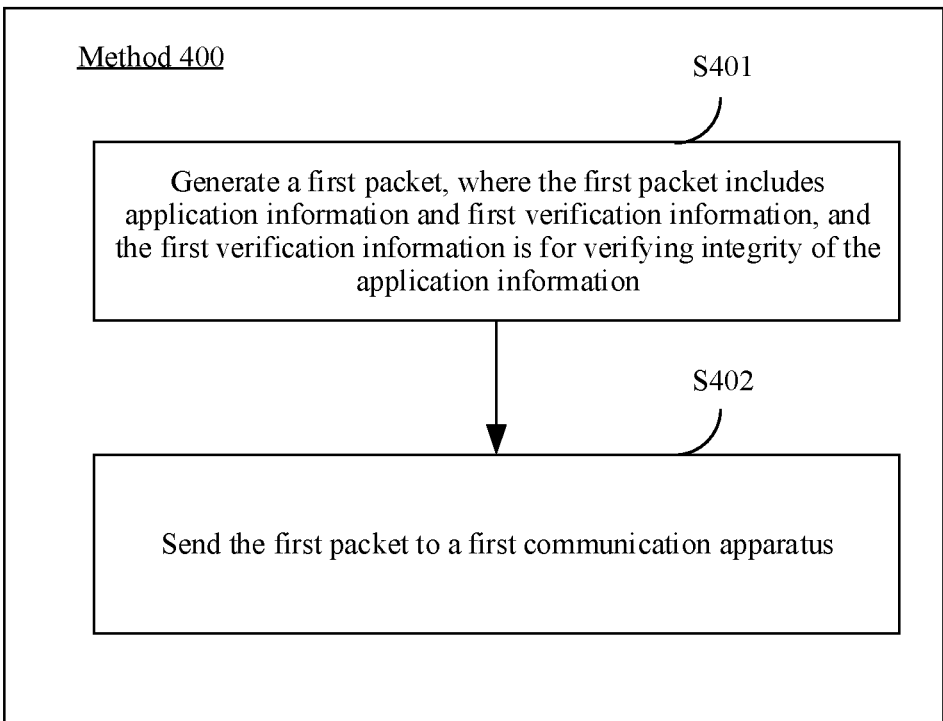
FIG. 7 is a schematic flowchart of a packet processing method according to an embodiment of the present disclosure.

Embodiments of the present disclosure further provide a packet processing method 400. FIG. 7 is a schematic flowchart of the packet processing method according to an embodiment of the present disclosure.

The method 700 shown in FIG. 7 may be performed by a second communication apparatus, and the second communication apparatus may be, for example, the communication apparatus 2 mentioned in the foregoing embodiment. The method 400 shown in FIG. 7 may be applied to the method 100 mentioned in the foregoing embodiment. In the method 400, steps performed by the communication apparatus 2 in the foregoing method 100 are performed. For example, the method 400 may include the following steps 401 and S402.

S401: Generate a first packet, where the first packet includes application information and first verification information, and the first verification information is for verifying integrity of the application information.

S402: Send the first packet to a first communication apparatus.

The first packet in the method 400 may correspond to the packet 1 in the method 100; the application information in the method 400 may correspond to the application information 1 in the method 100; the first verification information in the method 400 may correspond to the verification information 1 in the method 100.

In an implementation, the first verification information is obtained based on a target field in the first packet, and the target field includes the application information.

The target field in the method 400 may correspond to the field 1, the field 2, the field 3, the field 4, or the field 5 in the method 100.

In an implementation, the first verification information is obtained by performing calculation on the target field in the first packet by using a first verification method, and the target field includes the application information.

The first verification method in the method 400 may correspond to the verification algorithm 1 in the method 100.

In an implementation, the first verification method is HMAC verification.

In an implementation, the first verification information includes first HMAC verification information.

When the first verification method is the HMAC verification, the target field in the method 300 corresponds to the field 1 in the method 100.

In an implementation, the first HMAC verification information in the method 400 may correspond to the verification information 1 obtained by appending the key 1 to the field 1 as an input of the hash algorithm 1 in the method 100.

In an implementation, the first HMAC verification information in the method 400 may correspond to the HMAC 2 in the method 100.

In an implementation, the first verification method is digital signature verification.

In an implementation, the first verification information is a digital signature obtained by signing the target field by using a first private key.

When the first verification method is the digital signature, the target field corresponds to the field 2 in the method 100, the first private key corresponds to the private key 1 in the method 100, and the digital signature corresponds to the digital signature 1 in the method 100.

In an implementation, the first verification information is an encrypted digest in a digital certificate, and the digital certificate further includes the application information.

The digital certificate mentioned herein may correspond to the digital certificate 1 in the method 100. Correspondingly, the encrypted digest in the digital certificate may correspond to the encrypted digest 1 in the method 100.

In an implementation, the first verification information is sent by a control management device to the second communication apparatus.

In an implementation, the first verification method is IPsec-based integrity verification.

When the first verification method is the IPsec-based integrity verification, the first verification method may be AH verification or ESP verification.

In an implementation, the first verification information is first AH verification information.

The first AH verification information may correspond to the AH verification information 1 or the AH verification information 2 in the method 100. When the first packet is encapsulated in transport mode, the first AH verification information corresponds to the AH verification information 1 in the method 100. When the first packet is encapsulated in tunnel mode, the first AH verification information corresponds to the AH verification information 2 in the method 100.

In an implementation, the first verification information is first ESP verification information.

The first ESP verification information may correspond to the ESP verification information 1 in the method 100.

In an implementation, the second communication apparatus is a server or user equipment.

In an implementation, the user equipment includes an IoT device or a terminal device. In the foregoing method 300 and method 400:

In an implementation, the application information and the first verification information are carried in a packet header of the first packet.

In an implementation, the first packet is an IPV6 packet.

In an implementation, the application information is carried in an IPV6 extension header.

In an implementation, the application information is carried in a destination address.

In an implementation, the application information is carried in a source address.

In an implementation, the first verification information is carried in the IPV6 extension header.

In an implementation, the first verification information is carried in the destination address.

In an implementation, the first verification information is carried in the source address.

In an implementation, the first packet is a MPLS packet.

In an implementation, the application information is carried in a label value field.

In an implementation, the application information is carried in an extension TLV field.

In an implementation, the first verification information is carried in the label value field.

In an implementation, the first verification information is carried in the extension TLV field.

In an implementation, the first packet is a SRv6 packet.

In an implementation, the application information is carried in an SRH.

In an implementation, the first verification information is carried in the SRH.

In an implementation, the first packet is an IPV4 packet.

In an implementation, the application information is carried in an option field.

In an implementation, the first verification information is carried in the option field.

In an implementation, the first packet is a GRE packet.

In an implementation, the application information is carried in a keyword key field.

In an implementation, the first verification information is carried in the key field.

In an implementation, the first packet is a VXLAN packet.

In an implementation, the application information is carried in a virtual network identifier field.

In an implementation, the application information is carried in a reserved field.

In an implementation, the first verification information is carried in the virtual network identifier field.

In an implementation, the first verification information is carried in the reserved field.

In an implementation, the first packet is a NVGRE packet.

In an implementation, the application information is carried in a flow identifier field.

In an implementation, the application information is carried in a virtual network identifier field.

In an implementation, the application information is carried in a reserved field.

In an implementation, the first verification information is carried in the flow identifier field.

In an implementation, the first verification information is carried in the virtual network identifier field.

In an implementation, the first verification information is carried in the reserved field.

In an implementation, the first packet is a Geneve packet.

In an implementation, the application information is carried in a reserved field.

In an implementation, the application information is carried in a variable length options field.

In an implementation, the first verification information is carried in the reserved field.

In an implementation, the first verification information is carried in the variable length options field.

For specific implementations of the method 300 and the method 400, refer to the foregoing descriptions of the method 100.

Figure 8:
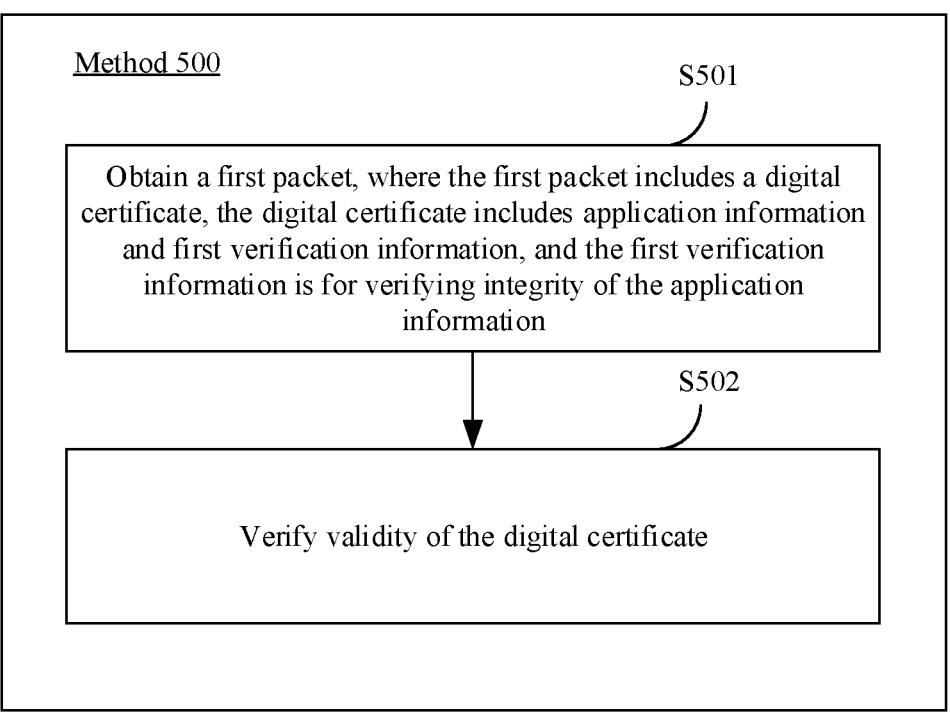
FIG. 8 is a schematic flowchart of an application information verification method according to an embodiment of the present disclosure.

An embodiment of the present disclosure further provides an application information verification method 500. FIG. 8 is a schematic flowchart of an application information verification method according to an embodiment of the present disclosure.

The method 500 shown in FIG. 8 may be performed by a first communication apparatus, and the first communication apparatus may be, for example, the communication apparatus 1 mentioned in the foregoing embodiment. The method 500 shown in FIG. 8 may be applied to the method 200 mentioned in the foregoing embodiment. In the method 500, steps performed by the communication apparatus 1 in the foregoing method 200 are performed. For example, the method 500 may include the following steps S501 and S502.

S501: Obtain a first packet, where the first packet includes a digital certificate, the digital certificate includes application information and first verification information, and the first verification information is for verifying integrity of the application information.

S502: Verify validity of the digital certificate.

In the method 500, the first packet may correspond to the packet 1 in the method 200, the digital certificate may correspond to the digital certificate 1 in the method 200, the application information may correspond to the application information 1 in the method 200, and the first verification information may correspond to the verification information 1 in the method 100.

In an implementation, the first packet further includes second verification information, and the second verification information is for verifying the integrity of the application information. The method further includes verifying the integrity of the application information based on the second verification information.

The second verification information in the method 500 may correspond to the verification information 2 in the method 200.

In an implementation, the verifying the integrity of the application information based on the second verification information includes obtaining third verification information based on a target field in the first packet, where the target field includes the application information; and performing matching verification on the third verification information and the second verification information.

For verification of the application information by using the second verification information, refer to the related descriptions of verifying the application information by using the first verification information in the method 300.

In an implementation, the verifying the integrity of the application information based on the second verification information includes verifying the integrity of the application information based on a digital signature algorithm and the second verification information.

In an implementation, the second verification information is a digital signature obtained by signing the target field in the first packet through a first private key and first hash calculation, and the verifying the integrity of the application information based on a digital signature algorithm and the second verification information includes decrypting the digital signature by using a first public key to obtain a first plaintext; performing second hash calculation on the target field to obtain a second plaintext, where the first hash calculation and the second hash calculation use a same hash algorithm; and performing matching verification on the first plaintext and the second plaintext.

In an implementation, the first public key is carried in the digital certificate.

In an implementation, a decryption algorithm for decrypting the digital signature is carried in the digital certificate, and/or the hash algorithm is carried in the digital certificate.

Figure 9:
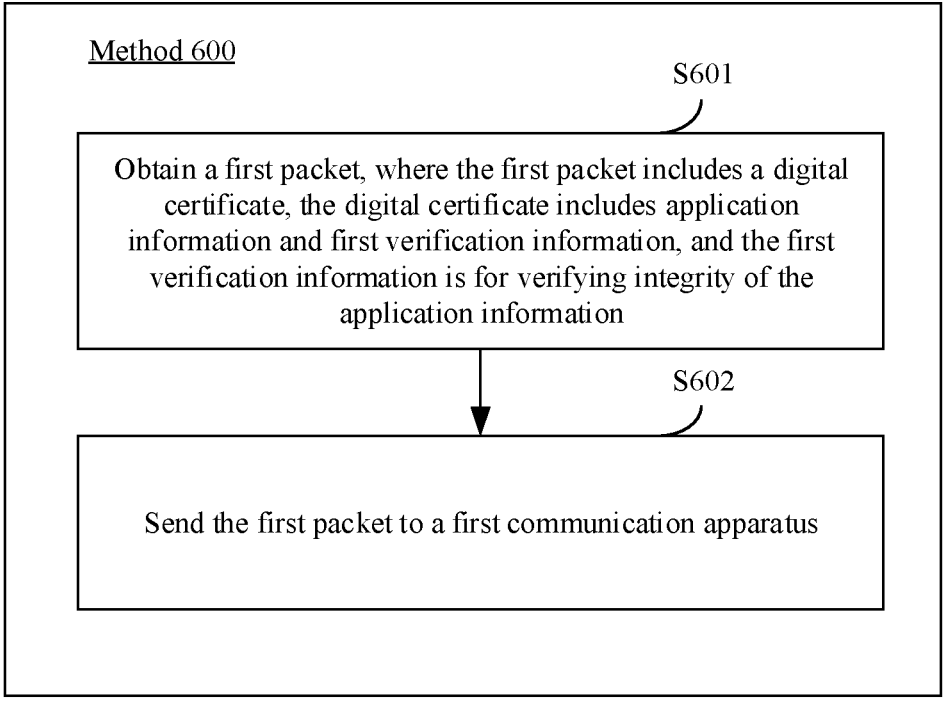
FIG. 9 is a schematic flowchart of a packet processing method according to an embodiment of the present disclosure.

Embodiments of the present disclosure further provide a packet processing method 600. FIG. 9 is a schematic flowchart of the packet processing method according to an embodiment of the present disclosure.

The method 600 shown in FIG. 9 may be performed by a second communication apparatus, and the second communication apparatus may be, for example, the communication apparatus 2 mentioned in the foregoing embodiment. The method 600 shown in FIG. 9 may be applied to the method 200 mentioned in the foregoing embodiment. In the method 600, steps performed by the communication apparatus 2 in the foregoing method 200 are performed. For example, the method 600 may include the following steps S601 and S602.

S601: Obtain a first packet, where the first packet includes a digital certificate, the digital certificate includes application information and first verification information, and the first verification information is for verifying integrity of the application information.

S602: Send the first packet to a first communication apparatus.

In the method 600, the first packet may correspond to the packet 1 in the method 200, the digital certificate may correspond to the digital certificate 1 in the method 200, the application information may correspond to the application information 1 in the method 200, and the first verification information may correspond to the verification information 1 in the method 100.

In an implementation, the first packet further includes second verification information, and the second verification information is for verifying the integrity of the application information.

The second verification information in the method 600 may correspond to the verification information 2 in the method 200.

In an implementation, the second verification information is obtained based on a target field in the first packet, and the target field includes the application information.

In an implementation, the second verification information is obtained by performing calculation on the target field in the first packet by using a first verification method, and the target field includes the application information.

In an implementation, the first verification method is digital signature verification.

In an implementation, the second verification information is a digital signature obtained by signing the target field by using a first private key.

The first private key mentioned herein may correspond to the private key 2 in the method 200, and the digital signature mentioned herein may correspond to the digital signature 1 in the method 200.

In an implementation, a first public key corresponding to the first private key is carried in the digital certificate, and the first public key is for verifying the second verification information.

The first public key mentioned herein may correspond to the public key 2 in the method 200.

In an implementation, a decryption algorithm for decrypting the digital signature is carried in the digital certificate, and/or a hash algorithm for verifying the second verification information is carried in the digital certificate.

The decryption algorithm mentioned herein may correspond to the decryption algorithm 1 in the method 200, and the hash algorithm for verifying the second verification information may correspond to the hash algorithm 2 in the method 200.

In the foregoing method 500 and method 600:

In an implementation, the digital certificate is carried in a packet header of the first packet.

In an implementation, the first packet is an IPv6 packet.

In an implementation, the digital certificate is carried in an IPV6 extension header.

In an implementation, the digital certificate is carried in a destination address.

In an implementation, the digital certificate is carried in a source address.

In an implementation, the first packet is a MPLS packet.

In an implementation, the digital certificate is carried in a label value field.

In an implementation, the digital certificate is carried in an extension TLV field.

In an implementation, the first packet is a SRv6 packet.

In an implementation, the digital certificate is carried in an SRH.

In an implementation, the first packet is an IPV4 packet.

In an implementation, the digital certificate is carried in an option field.

In an implementation, the first packet is a GRE packet.

In an implementation, the digital certificate is carried in a key field.

In an implementation, the first packet is a VXLAN packet.

In an implementation, the digital certificate is carried in a virtual network identifier field.

In an implementation, the digital certificate is carried in a reserved field.

In an implementation, the first packet is a NVGRE packet.

In an implementation, the digital certificate is carried in a flow identifier field.

In an implementation, the digital certificate is carried in a virtual network identifier field.

In an implementation, the digital certificate is carried in a reserved field.

In an implementation, the first packet is a Geneve packet.

In an implementation, the digital certificate is carried in a reserved field.

In an implementation, the digital certificate is carried in a variable length options field.

In an implementation, the first verification information is an encrypted digest in the digital certificate.

For specific implementations of the method 500 and the method 600, refer to the foregoing descriptions of the method 200.

Figure 10:
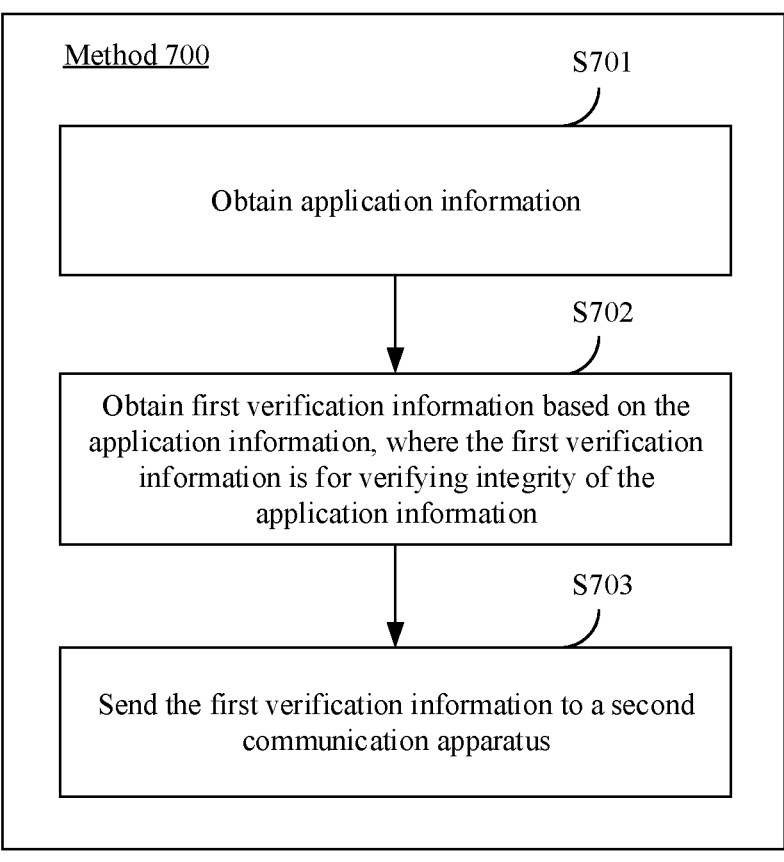
FIG. 10 is a schematic flowchart of an application information processing method according to an embodiment of the present disclosure.

An embodiment of the present disclosure further provides an application information processing method 700. FIG. 10 is a schematic flowchart of an application information processing method according to an embodiment of the present disclosure.

The method 700 shown in FIG. 10 may be performed by a control management device. The method 700 shown in FIG. 9 may be applied to the method 100 or 200 mentioned in the foregoing embodiment. In the method 700, steps performed by the control management device in the foregoing method 100 or 200 are performed. For example, the method 700 may include the following steps S701 to S703.

S701: Obtain application information.

S702: Obtain first verification information based on the application information, where the first verification information is for verifying integrity of the application information.

S703: Send the first verification information to a second communication apparatus.

In the method 700, the application information may correspond to the application information 1 in the method 100 or the method 200, the first verification information may correspond to the verification information 1 in the method 100 or the method 200, and the second communication apparatus may correspond to the communication apparatus 2 in the method 100 or the method 200.

In an implementation, the obtaining first verification information based on the application information includes performing calculation on the application information based on a first verification method, to obtain the first verification information.

The first verification method mentioned herein may correspond to the verification algorithm 1 in the method 100.

In an implementation, the first verification method is HMAC verification.

In an implementation, the first verification information includes first HMAC verification information.

In an example, the first HMAC verification information may correspond to the verification information 1 obtained by appending the key 1 to the field 1 as an input of the hash algorithm 1 in the method 100. In another example, the first HMAC verification information may correspond to the HMAC 2 in the method 100.

In an implementation, the first verification method is digital signature verification.

In an implementation, the first verification information is a digital signature obtained by signing the application information through a first private key and first hash calculation.

The first private key corresponds to the private key 1 in the method 100, the first hash calculation corresponds to the hash algorithm 3 in the method 100, and the digital signature corresponds to the digital signature 1 in the method 100.

In an implementation, the obtaining first verification information based on the application information includes obtaining a digital certificate based on the application information, where the digital certificate includes the first verification information.

The digital certificate mentioned herein may correspond to, for example, the digital certificate 1 in the method 100.

In an implementation, the sending the first verification information to a second communication apparatus includes sending the digital certificate to the second communication apparatus.

In an implementation, the method further includes obtaining second verification information based on the application information, where the second verification information is for verifying integrity of the application information; and sending the second verification information to the second communication apparatus.

The second verification information mentioned herein may, for example, correspond to the verification information 3 in the method 100.

In an implementation, the obtaining second verification information based on the application information includes performing calculation on the application information based on a second verification method, to obtain the second verification information.

In an implementation, the second verification method is the HMAC verification.

In an implementation, the second verification information includes second HMAC verification information.

For the second HMAC verification information, refer to the foregoing descriptions of the first HMAC verification information.

In an implementation, the second verification method is the digital signature verification.

In an implementation, the second verification information is a digital signature obtained by signing the application information through a second private key and second hash calculation.

In an implementation, the first verification method and the second verification method are different verification methods.

For a specific implementation of the method 700, refer to the foregoing descriptions of the method 100 and the method 200.

Figure 11:
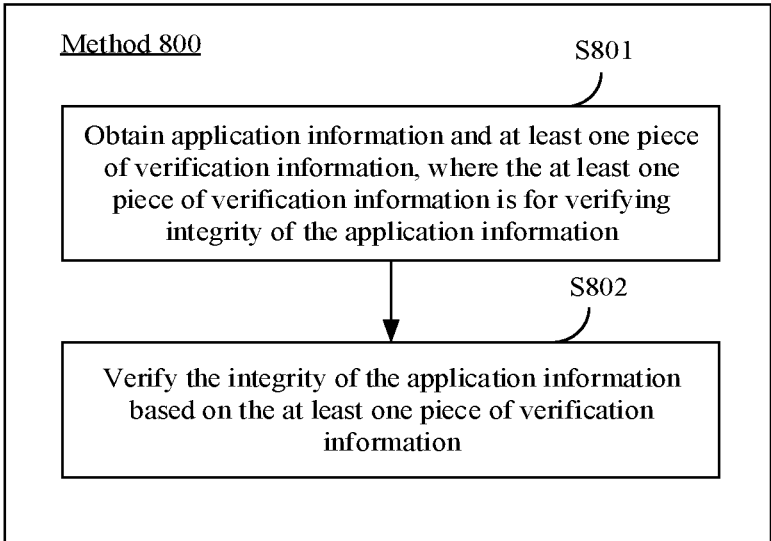
FIG. 11 is a schematic flowchart of an application information verification method according to an embodiment of the present disclosure.

An embodiment of the present disclosure further provides an application information verification method 800. FIG. 11 is a schematic flowchart of an application information verification method according to an embodiment of the present disclosure.

The method 800 shown in FIG. 11 may be performed by a first communication apparatus, and the first communication apparatus may be, for example, the communication apparatus 1 mentioned in the foregoing embodiment. The method 800 shown in FIG. 11 may be applied to the method 100 mentioned in the foregoing embodiment. In the method 800, steps performed by the communication apparatus 1 in the foregoing method 100 are performed. For example, the method 800 may include the following steps S801 and S802.

S801: Obtain application information and at least one piece of verification information, where the at least one piece of verification information is for verifying integrity of the application information.

S802: Verify the integrity of the application information based on the at least one piece of verification information.

In the method 800, the at least one piece of verification information may correspond to the verification information 1 in the method 100 or may correspond to the verification information 1 and the verification information 3 in the method 100.

In an implementation, the obtaining application information and at least one piece of verification information includes receiving a first packet, where the first packet includes the application information and the at least one piece of verification information.

The first packet may correspond to the packet 1 in the method 100.

In an implementation, the at least one piece of verification information includes first verification information.

The first verification information may correspond to the verification information 1 in the method 100.

In an implementation, the verifying the integrity of the application information based on the at least one piece of verification information includes obtaining third verification information based on a first target field in the first packet, where the first target field includes the application information; and performing matching verification on the third verification information and the first verification information.

The first target field in the method 800 may correspond to the field 1, the field 2, the field 3, the field 4, or the field 5 in the method 100. The third verification information in the method 800 may correspond to the verification information 2 in the method 100.

In an implementation, the verifying the integrity of the application information based on the at least one piece of verification information includes verifying the integrity of the application information based on a first verification method and the first verification information.

The first verification method in the method 800 may correspond to the verification algorithm 1 in the method 100.

In an implementation, the first verification method is HMAC verification.

In an implementation, the first verification information includes first HMAC verification information, and the verifying the integrity of the application information based on a first verification method and the first verification information includes performing HMAC calculation on the first target field to obtain second HMAC verification information; and performing matching verification on the first HMAC verification information and the second HMAC verification information.

In an implementation, the first HMAC verification information in the method 800 may correspond to the verification information 1 obtained by appending the key 1 to the field 1 as an input of the hash algorithm 1 in the method 100. Correspondingly, the second HMAC verification information may correspond to the verification information 2 obtained by appending the key 1 to the field 1 as an input of the hash algorithm 1 in the method 100.

In an implementation, the first HMAC verification information in the method 800 may correspond to the HMAC 2 in the method 100, and correspondingly the second HMAC verification information may correspond to the HMAC 2' in the method 100.

In an implementation, the first verification method is digital signature verification.

In an implementation, the first verification information is a digital signature obtained by signing the first target field in the first packet through a first private key and first hash calculation, and the verifying the integrity of the application information based on a first verification method and the first verification information includes decrypting the digital signature by using a first public key to obtain a first plaintext; performing second hash calculation on the first target field to obtain a second plaintext, where the first hash calculation and the second hash calculation use a same hash algorithm; and performing matching verification on the first plaintext and the second plaintext.

When the first verification method is the digital signature, the first target field corresponds to the field 2 in the method 100, the first private key corresponds to the private key 1 in the method 100, the first hash calculation corresponds to the hash algorithm 3 in the method 100, the digital signature corresponds to the digital signature 1 in the method 100, the first public key corresponds to the public key 1 in the method 100, the first plaintext corresponds to the hash digest 1" in the method 100, the second hash calculation corresponds to the hash algorithm 3 in the method 100, and the second plaintext may correspond to the hash digest 1' in the method 100.

In an implementation, the first packet includes a digital certificate, and the first public key is carried in the digital certificate.

The digital certificate in the method 800 corresponds to the digital certificate 1 in the method 100, and the first public key corresponds to the public key 1 in the method 100.

In an implementation, the digital certificate further includes a decryption algorithm for decrypting the digital signature, and/or the hash algorithm.

The decryption algorithm mentioned herein may correspond to the decryption algorithm 1 in the method 100, and the hash algorithm mentioned herein may correspond to the hash algorithm 3 in the method 100.

In an implementation, the method further includes verifying validity of the digital certificate.

In an implementation, the first verification method is IPsec-based integrity verification.

When the first verification method is the IPsec-based integrity verification, the first verification method may be AH verification or ESP verification.

In an implementation, the first verification information is first AH verification information, and the verifying the integrity of the application information based on a first verification method and the first verification information includes performing calculation on the first target field by using an AH verification algorithm, to obtain second AH verification information; and performing matching verification on the first AH verification information and the second AH verification information.

When the first verification method is the AH verification, the first verification information is the first AH verification information, and the second verification information is the second AH verification information. The first AH verification information may correspond to the AH verification information 1 or the AH verification information 2 in the method 100, and the second AH verification information may correspond to the AH verification information 3 or the AH verification information 4 in the method 100.

In an example, when the first packet is encapsulated in transport mode, the first AH verification information corresponds to the AH verification information 1 in the method 100, the second verification information corresponds to the AH verification information 3 in the method 100, and the first target field may correspond to the field 3 in the method 100. When the first packet is encapsulated in tunnel mode, the first AH verification information corresponds to the AH verification information 2 in the method 100, the second verification information corresponds to the AH verification information 4 in the method 100, and the first target field may correspond to the field 4 in the method 100.

In an implementation, the first verification information is first ESP verification information, and the verifying the integrity of the application information based on a first verification method and the first verification information includes performing calculation on the first target field by using an ESP verification algorithm, to obtain second ESP verification information; and performing matching verification on the first ESP verification information and the second ESP verification information.

When the first verification method is the ESP verification, the first verification information is the first ESP verification information, and the second verification information is the second ESP verification information. The first ESP verification information may correspond to the ESP verification information 1 in the method 100, the second ESP verification information may correspond to the ESP verification information 2 in the method 100, and the first target field may correspond to the field 5 in the method 100.

In an implementation, the first packet includes a digital certificate, the application information and the at least one piece of verification information are carried in the digital certificate, and the verifying the integrity of the application information based on a first verification method and the first verification information includes verifying validity of the digital certificate.

In an implementation, the at least one piece of verification information further includes second verification information.

The second verification information mentioned herein may correspond to the verification information 3 in the method 100.

In an implementation, the verifying the integrity of the application information based on the at least one piece of verification information includes obtaining fourth verification information based on a second target field in the first packet, where the second target field includes the application information; and performing matching verification on the fourth verification information and the second verification information.

In an implementation, the verifying the integrity of the application information based on the at least one piece of verification information includes verifying the integrity of the application information based on a second verification method and the second verification information, in an implementation, the first verification method and the second verification method are different verification algorithms.

For the second verification information, refer to the related descriptions of the first verification information.

In an implementation, the first communication apparatus is a network device.

In an implementation, the first communication apparatus includes an ACC device, a CPE device, an RG, a data center server access leaf device, a DC GW, an ASBR, a BNG, or a PE device.

In an implementation, the method further includes forwarding the first packet when it is determined that the application information passes the verification.

In an implementation, the method further includes discarding the first packet when it is determined that the application information fails the verification.

Embodiments of the present disclosure further provide a packet processing method 900. FIG. 12 is a schematic flowchart of the packet processing method according to an embodiment of the present disclosure.

The method 900 shown in FIG. 12 may be performed by a second communication apparatus, and the second communication apparatus may be, for example, the communication apparatus 2 mentioned in the foregoing embodiment. The method 900 shown in FIG. 12 may be applied to the method 100 mentioned in the foregoing embodiment. In the method 900, steps performed by the communication apparatus 2 in the foregoing method 100 are performed. For example, the method 900 may include the following steps S901 and S902.

S901: Obtain application information and at least one piece of verification information, where the at least one piece of verification information is for verifying integrity of the application information.

S902: Send the application information and the at least one piece of verification information to a first communication apparatus.

In the method 900, the at least one piece of verification information may correspond to the verification information 1 in the method 100 or may correspond to the verification information 1 and the verification information 3 in the method 100.

In an implementation, the obtaining application information and at least one piece of verification information includes obtaining a first packet, where the first packet includes the application information and the at least one piece of verification information; and the sending the application information and the at least one piece of verification information to a first communication apparatus includes sending the first packet to the first communication apparatus.

The first packet may correspond to the packet 1 in the method 100, and the first communication apparatus may correspond to the communication apparatus 1 in the method 100.

In an implementation, the at least one piece of verification information includes first verification information.

The first verification information may correspond to the verification information 1 in the method 100.

In an implementation, the first verification information is obtained based on a first target field in the first packet, and the first target field includes the application information.

The first target field in the method 900 may correspond to the field 1, the field 2, the field 3, the field 4, or the field 5 in the method 100.

In an implementation, the first verification information is obtained by performing calculation on the first target field in the first packet by using a first verification method, and the first target field includes the application information.

The first verification method in the method 900 may correspond to the verification algorithm 1 in the method 100.

In an implementation, the first verification method is HMAC verification.

In an implementation, the first verification information includes first HMAC verification information.

When the first verification method is the HMAC verification, the target field in the method 300 corresponds to the field 1 in the method 100.

In an implementation, the first HMAC verification information in the method 900 may correspond to the verification information 1 obtained by appending the key 1 to the field 1 as an input of the hash algorithm 1 in the method 100.

In an implementation, the first HMAC verification information in the method 900 may correspond to the HMAC 2 in the method 100.

In an implementation, the first verification method is digital signature verification.

In an implementation, the first verification information is a digital signature obtained by signing the first target field by using the first private key.

When the first verification method is the digital signature, the first target field corresponds to the field 2 in the method 100, the first private key corresponds to the private key 1 in the method 100, and the digital signature corresponds to the digital signature 1 in the method 100.

In an implementation, the first verification information is an encrypted digest in a digital certificate, and the digital certificate further includes the application information.

The digital certificate mentioned herein may correspond to the digital certificate 1 in the method 100. Correspondingly, the encrypted digest in the digital certificate may correspond to the encrypted digest 1 in the method 100.

In an implementation, the first verification information is sent by a control management device to the second communication apparatus.

In an implementation, the first verification method is IPsec-based integrity verification.

When the first verification method is the IPsec-based integrity verification, the first verification method may be AH verification or ESP verification.

In an implementation, the first verification information is first AH verification information.

The first AH verification information may correspond to the AH verification information 1 or the AH verification information 2 in the method 100. When the first packet is encapsulated in transport mode, the first AH verification information corresponds to the AH verification information 1 in the method 100. When the first packet is encapsulated in tunnel mode, the first AH verification information corresponds to the AH verification information 2 in the method 100.

In an implementation, the first verification information is first ESP verification information.

The first ESP verification information may correspond to the ESP verification information 1 in the method 100.

In an implementation, the at least one piece of verification information further includes second verification information.

The second verification information may correspond to the verification information 3 in the method 100.

In an implementation, the second verification information is obtained based on a second target field in the first packet, and the second target field includes the application information.

For the second target field, refer to the descriptions of the first target field.

In an implementation, the second verification information is obtained by performing calculation on the second target field in the first packet by using a second verification method, and the second target field includes the application information.

For the second verification method, refer to the descriptions of the first verification method. In an implementation, the first verification method and the second verification method are different verification algorithms.

In the foregoing method 800 and method 900:

In an implementation, the application information and the at least one piece of verification information are carried in a packet header of the first packet.

In an implementation, the first packet is an IPV6 packet.

In an implementation, the application information is carried in an IPV6 extension header.

In an implementation, the application information is carried in a destination address.

In an implementation, the application information is carried in a source address.

In an implementation, the at least one piece of verification information is carried in the IPv6 extension header.

In an implementation, the at least one piece of verification information is carried in the destination address.

In an implementation, the at least one piece of verification information is carried in the source address.

In an implementation, the first packet is a MPLS packet.

In an implementation, the application information is carried in a label value field.

In an implementation, the application information is carried in an extension TLV field.

In an implementation, the at least one piece of verification information is carried in the label value field.

In an implementation, the at least one piece of verification information is carried in the extension TLV field.

In an implementation, the first packet is a SRv6 packet.

In an implementation, the application information is carried in an SRH.

In an implementation, the at least one piece of verification information is carried in the SRH.

In an implementation, the first packet is an IPV4 packet.

In an implementation, the application information is carried in an option field.

In an implementation, the at least one piece of verification information is carried in the option field.

In an implementation, the first packet is a GRE packet.

In an implementation, the application information is carried in a keyword key field.

In an implementation, the at least one piece of verification information is carried in the key field.

In an implementation, the first packet is a VXLAN packet.

In an implementation, the application information is carried in a virtual network identifier field.

In an implementation, the application information is carried in a reserved field.

In an implementation, the at least one piece of verification information is carried in the virtual network identifier field.

In an implementation, the at least one piece of verification information is carried in the reserved field.

In an implementation, the first packet is a NVGRE packet.

In an implementation, the application information is carried in a flow identifier field.

In an implementation, the application information is carried in a virtual network identifier field.

In an implementation, the application information is carried in a reserved field.

In an implementation, the at least one piece of verification information is carried in the flow identifier field.

In an implementation, the at least one piece of verification information is carried in the virtual network identifier field.

In an implementation, the at least one piece of verification information is carried in the reserved field.

In an implementation, the first packet is a Geneve packet.

In an implementation, the application information is carried in a reserved field.

In an implementation, the application information is carried in a variable length options field.

In an implementation, the at least one piece of verification information is carried in the reserved field.

In an implementation, the at least one piece of verification information is carried in the variable length options field.

For specific implementations of the method 800 and the method 900, refer to the foregoing descriptions of the method 100.

In addition, an embodiment of the present disclosure further provides a communication apparatus 1300, as shown in FIG. 13. FIG. 13 is a schematic structural diagram of a communication apparatus according to an embodiment of the present disclosure. The communication apparatus 1300 includes a transceiver unit 1301 and a processing unit 1302. The communication apparatus 1300 may be configured to perform the method 100, the method 200, the method 300, the method 400, the method 500, the method 600, the method 700, the method 800, or the method 900 in the foregoing embodiments.

In an example, the communication apparatus 1300 may perform the method 100 in the foregoing embodiment. When the communication apparatus 1300 is configured to perform the method 100 in the foregoing embodiment, the communication apparatus 1300 is equivalent to the communication apparatus 1 in the method 100. The transceiver unit 1301 is configured to perform receiving and sending operations performed by the communication apparatus 1 in the method 100. The processing unit 1302 is configured to perform an operation other than the receiving and sending operations performed by the communication apparatus 1 in the method 100. For example, the processing unit 1302 is configured to generate a packet 1, where the packet 1 includes application information 1 and verification information 1; and the transceiver unit 1301 is configured to send the packet 1 to a communication apparatus 2.

In an example, the communication apparatus 1300 may perform the method 100 in the foregoing embodiment. When the communication apparatus 1300 is configured to perform the method 100 in the foregoing embodiment, the communication apparatus 1300 is equivalent to the communication apparatus 2 in the method 100. The transceiver unit 1301 is configured to perform receiving and sending operations performed by the communication apparatus 2 in the method 100. The processing unit 1302 is configured to perform an operation other than the receiving and sending operations performed by the communication apparatus 2 in the method 100. For example, the transceiver unit 1301 is configured to receive a packet 1, where the packet 1 includes application information 1 and verification information 1; and the processing unit 1302 is configured to verify integrity of the application information 1 in the packet 1 based on the verification information 1 in the packet 1.

In an example, the communication apparatus 1300 may perform the method 200 in the foregoing embodiment. When the communication apparatus 1300 is configured to perform the method 200 in the foregoing embodiment, the communication apparatus 1300 is equivalent to the communication apparatus 1 in the method 200. The transceiver unit 1301 is configured to perform receiving and sending operations performed by the communication apparatus 1 in the method 200. The processing unit 1302 is configured to perform an operation other than the receiving and sending operations performed by the communication apparatus 1 in the method 200. For example, the processing unit 1302 is configured to generate a packet 1, where the packet 1 includes a digital certificate 1, the digital certificate 1 includes application information 1 and verification information 1, and the verification information 1 is for verifying integrity of the application information 1; and the transceiver unit 1301 is configured to send the packet 1 to a communication apparatus 2.

In an example, the communication apparatus 1300 may perform the method 200 in the foregoing embodiment. When the communication apparatus 1300 is configured to perform the method 200 in the foregoing embodiment, the communication apparatus 1300 is equivalent to the communication apparatus 2 in the method 200. The transceiver unit 1301 is configured to perform receiving and sending operations performed by the communication apparatus 2 in the method 200. The processing unit 1302 is configured to perform an operation other than the receiving and sending operations performed by the communication apparatus 2 in the method 200. For example, the transceiver unit 1301 is configured to receive a packet 1, where the packet 1 includes a digital certificate 1, the digital certificate 1 includes application information 1 and verification information 1, and the verification information 1 is for verifying integrity of the application information 1; and the processing unit 1302 is configured to verify validity of the digital certificate 1. In an example, the communication apparatus 1300 may perform the method 300 in the foregoing embodiment. When the communication apparatus 1300 is configured to perform the method 300 in the foregoing embodiment, the communication apparatus 1300 is equivalent to the first communication apparatus in the method 300. The transceiver unit 1301 is configured to perform receiving and sending operations performed by the first communication apparatus in the method 300. The processing unit 1302 is configured to perform an operation other than the receiving and sending operations performed by the first communication apparatus in the method 300. For example, the transceiver unit 1301 is configured to receive a first packet, where the first packet includes application information and first verification information; and the processing unit 1302 is configured to verify integrity of the application information in the first packet based on the first verification information in the first packet.

In an example, the communication apparatus 1300 may perform the method 400 in the foregoing embodiment. When the communication apparatus 1300 is configured to perform the method 400 in the foregoing embodiment, the communication apparatus 1300 is equivalent to the second communication apparatus in the method 400. The transceiver unit 1301 is configured to perform receiving and sending operations performed by the second communication apparatus in the method 400. The processing unit 1302 is configured to perform an operation other than the receiving and sending operations performed by the second communication apparatus in the method 400. For example, the processing unit 1302 is configured to generate a first packet, where the first packet includes application information and first verification information, and the first verification information is for verifying integrity of the application information; and the transceiver unit 1301 is configured to send the first packet to a first communication apparatus.

In an example, the communication apparatus 1300 may perform the method 500 in the foregoing embodiment.

When the communication apparatus 1300 is configured to perform the method 500 in the foregoing embodiment, the communication apparatus 1300 is equivalent to the first communication apparatus in the method 500. The transceiver unit 1301 is configured to perform receiving and sending operations performed by the first communication apparatus in the method 500. The processing unit 1302 is configured to perform an operation other than the receiving and sending operations performed by the first communication apparatus in the method 500. For example, the transceiver unit 1301 is configured to obtain a first packet, where the first packet includes a digital certificate, the digital certificate includes application information and first verification information, and the first verification information is for verifying integrity of the application information; and the processing unit 1302 is configured to verify validity of the digital certificate.

In an example, the communication apparatus 1300 may perform the method 600 in the foregoing embodiment. When the communication apparatus 1300 is configured to perform the method 600 in the foregoing embodiment, the communication apparatus 1300 is equivalent to the second communication apparatus in the method 600. The transceiver unit 1301 is configured to perform receiving and sending operations performed by the second communication apparatus in the method 600. The processing unit 1302 is configured to perform an operation other than the receiving and sending operations performed by the second communication apparatus in the method 600. For example, the processing unit 1302 is configured to obtain a first packet, where the first packet includes a digital certificate, the digital certificate includes application information and first verification information, and the first verification information is for verifying integrity of the application information; and the transceiver unit 1301 is configured to send the first packet to a first communication apparatus.

In an example, the communication apparatus 1300 may perform the method 700 in the foregoing embodiment. When the communication apparatus 1300 is configured to perform the method 700 in the foregoing embodiment, the communication apparatus 1300 is equivalent to the control management device in the method 700. The transceiver unit 1301 is configured to perform receiving and sending operations performed by the control management device in the method 700. The processing unit 1302 is configured to perform an operation other than the receiving and sending operations performed by the control management device in the method 700. For example, the transceiver unit 1301 is configured to obtain application information, the processing unit 1302 is configured to obtain first verification information based on the application information, where the first verification information is for verifying integrity of the application information, and the transceiver unit 1301 is further configured to send the first verification information to a second communication apparatus.

In an example, the communication apparatus 1300 may perform the method 800 in the foregoing embodiment. When the communication apparatus 1300 is configured to perform the method 800 in the foregoing embodiment, the communication apparatus 1300 is equivalent to the first communication apparatus in the method 800. The transceiver unit 1301 is configured to perform receiving and sending operations performed by the first communication apparatus in the method 800. The processing unit 1302 is configured to perform an operation other than the receiving and sending operations performed by the first communication apparatus in the method 800. For example, the transceiver unit 1301 is configured to obtain application information and at least one piece of verification information, where the at least one piece of verification information is for verifying integrity of the application information; and the processing unit 1302 is configured to verify the integrity of the application information based on the at least one piece of verification information.

In an example, the communication apparatus 1300 may perform the method 900 in the foregoing embodiment. When the communication apparatus 1300 is configured to perform the method 900 in the foregoing embodiment, the communication apparatus 1300 is equivalent to the second communication apparatus in the method 900. The transceiver unit 1301 is configured to perform receiving and sending operations performed by the second communication apparatus in the method 900. The processing unit 1302 is configured to perform an operation other than the receiving and sending operations performed by the second communication apparatus in the method 900. For example, the processing unit 1302 is configured to obtain application information and at least one piece of verification information, where the at least one piece of verification information is for verifying integrity of the application information; and the transceiver unit 1301 is configured to send the application information and the at least one piece of verification information to a first communication apparatus.

Figure 14:
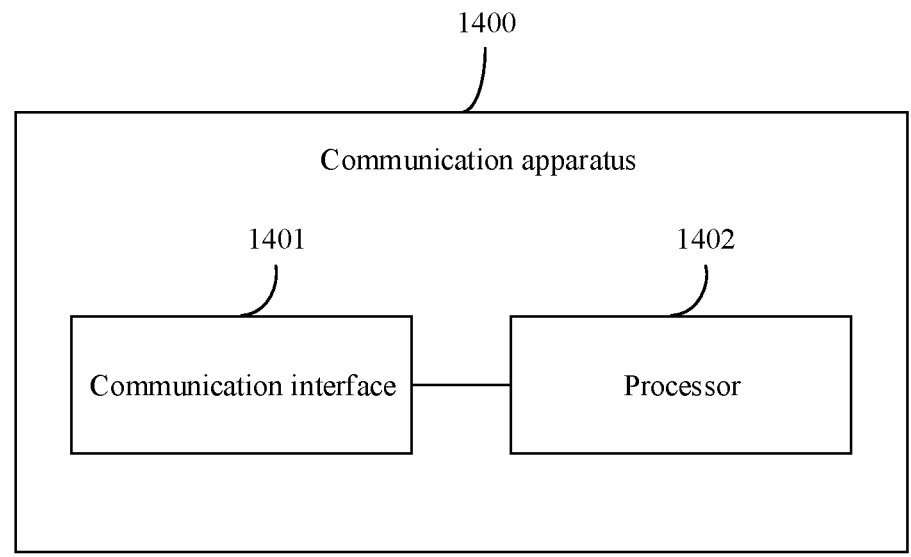
FIG. 14 is a schematic structural diagram of a communication apparatus according to an embodiment of the present disclosure.

In addition, an embodiment of the present disclosure further provides a communication apparatus 1400. FIG. 14 is a schematic structural diagram of a communication apparatus according to an embodiment of the present disclosure. The communication apparatus 1400 includes a communication interface 1401 and a processor 1402 connected to the communication interface 1401. The communication apparatus 1300 may be configured to perform the method 100, the method 200, the method 300, the method 400, the method 500, the method 600, the method 700, the method 800, or the method 900 in the foregoing embodiments.

In an example, the communication apparatus 1400 may perform the method 100 in the foregoing embodiment. When the communication apparatus 1400 is configured to perform the method 100 in the foregoing embodiment, the communication apparatus 1400 is equivalent to the communication apparatus 1 in the method 100. The communication interface 1401 is configured to perform receiving and sending operations performed by the communication apparatus 1 in the foregoing method 100. The processor 1402 is configured to perform an operation other than the receiving and sending operations performed by the communication apparatus 1 in the foregoing method 100. For example, the processor 1402 is configured to generate a packet 1, where the packet 1 includes application information 1 and verification information 1, and the verification information 1 is for verifying integrity of the application information 1; and the communication interface 1401 is configured to send the packet 1 to a communication apparatus 2.

In an example, the communication apparatus 1400 may perform the method 100 in the foregoing embodiment. When the communication apparatus 1400 is configured to perform the method 100 in the foregoing embodiment, the communication apparatus 1400 is equivalent to the communication apparatus 2 in the method 100. The communication interface 1401 is configured to perform receiving and sending operations performed by the communication apparatus 2 in the foregoing method 100. The processor 1402 is configured to perform an operation other than the receiving and sending operations performed by the communication apparatus 2 in the foregoing method 100. For example, the communication interface 1401 is configured to receive a packet 1, where the packet 1 includes application information 1 and verification information 1, and the verification information 1 is for verifying integrity of the application information 1; and the processor 1402 is configured to verify the integrity of the application information 1 by using the verification information 1.

In an example, the communication apparatus 1400 may perform the method 200 in the foregoing embodiment. When the communication apparatus 1400 is configured to perform the method 200 in the foregoing embodiment, the communication apparatus 1400 is equivalent to the communication apparatus 1 in the method 200. The communication interface 1401 is configured to perform receiving and sending operations performed by the communication apparatus 1 in the foregoing method 200. The processor 1402 is configured to perform an operation other than the receiving and sending operations performed by the communication apparatus 1 in the foregoing method 200. For example, the processor 1402 is configured to generate a packet 1, where the packet 1 includes a digital certificate 1, the digital certificate 1 includes application information 1 and verification information 1, and the verification information 1 is for verifying integrity of the application information 1; and the communication interface 1401 is configured to send the packet 1 to a communication apparatus 2.

In an example, the communication apparatus 1400 may perform the method 200 in the foregoing embodiment. When the communication apparatus 1400 is configured to perform the method 200 in the foregoing embodiment, the communication apparatus 1400 is equivalent to the communication apparatus 2 in the method 200. The communication interface 1401 is configured to perform receiving and sending operations performed by the communication apparatus 2 in the foregoing method 200. The processor 1402 is configured to perform an operation other than the receiving and sending operations performed by the communication apparatus 2 in the foregoing method 200. For example, the communication interface 1401 is configured to receive a packet 1, where the packet 1 includes a digital certificate 1, the digital certificate 1 includes application information 1 and verification information 1, and the verification information 1 is for verifying integrity of the application information 1; and the processor 1402 is configured to verify validity of the digital certificate 1.

In an example, the communication apparatus 1400 may perform the method 300 in the foregoing embodiment. When the communication apparatus 1400 is configured to perform the method 300 in the foregoing embodiment, the communication apparatus 1400 is equivalent to the first communication apparatus in the method 300. The communication interface 1401 is configured to perform receiving and sending operations performed by the first communication apparatus in the foregoing method 300. The processor 1402 is configured to perform an operation other than the receiving and sending operations performed by the first communication apparatus in the foregoing method 300. For example, the communication interface 1401 is configured to receive a first packet, where the first packet includes application information and first verification information; and the processor 1402 is configured to verify integrity of the application information in the first packet based on the first verification information in the first packet.

In an example, the communication apparatus 1400 may perform the method 400 in the foregoing embodiment. When the communication apparatus 1400 is configured to perform the method 400 in the foregoing embodiment, the communication apparatus 1400 is equivalent to the second communication apparatus in the method 400. The communication interface 1401 is configured to perform receiving and sending operations performed by the second communication apparatus in the foregoing method 400. The processor 1402 is configured to perform an operation other than the receiving and sending operations performed by the second communication apparatus in the foregoing method 400. For example, the processor 1402 is configured to generate a first packet, where the first packet includes application information and first verification information, and the first verification information is for verifying integrity of the application information; and the communication interface 1401 is configured to send the first packet to a first communication apparatus.

In an example, the communication apparatus 1400 may perform the method 500 in the foregoing embodiment. When the communication apparatus 1400 is configured to perform the method 500 in the foregoing embodiment, the communication apparatus 1400 is equivalent to the first communication apparatus in the method 500. The communication interface 1401 is configured to perform receiving and sending operations performed by the first communication apparatus in the foregoing method 500. The processor 1402 is configured to perform an operation other than the receiving and sending operations performed by the first communication apparatus in the foregoing method 500. For example, the communication interface 1401 is configured to obtain a first packet, where the first packet includes a digital certificate, the digital certificate includes application information and first verification information, and the first verification information is for verifying integrity of the application information; and the processor 1402 is configured to verify validity of the digital certificate.

In an example, the communication apparatus 1400 may perform the method 600 in the foregoing embodiment. When the communication apparatus 1400 is configured to perform the method 600 in the foregoing embodiment, the communication apparatus 1400 is equivalent to the second communication apparatus in the method 600. The communication interface 1401 is configured to perform receiving and sending operations performed by the second communication apparatus in the foregoing method 600. The processor 1402 is configured to perform an operation other than the receiving and sending operations performed by the second communication apparatus in the foregoing method 600. For example, the processor 1402 is configured to obtain a first packet, where the first packet includes a digital certificate, the digital certificate includes application information and first verification information, and the first verification information is for verifying integrity of the application information; and the communication interface 1401 is configured to send the first packet to a first communication apparatus.

In an example, the communication apparatus 1400 may perform the method 700 in the foregoing embodiment. When the communication apparatus 1400 is configured to perform the method 700 in the foregoing embodiment, the communication apparatus 1400 is equivalent to the control management device in the method 700. The communication interface 1401 is configured to perform receiving and sending operations performed by the control management device in the foregoing method 700. The processor 1402 is configured to perform an operation other than the receiving and sending operations performed by the control management device in the foregoing method 700. For example, the communication interface 1401 is configured to obtain application information, the processor 1402 is configured to obtain first verification information based on the application information, where the first verification information is for verifying integrity of the application information, and the communication interface 1401 is further configured to send the first verification information to a second communication apparatus.

In an example, the communication apparatus 1400 may perform the method 800 in the foregoing embodiment. When the communication apparatus 1400 is configured to perform the method 800 in the foregoing embodiment, the communication apparatus 1400 is equivalent to the first communication apparatus in the method 800. The communication interface 1401 is configured to perform receiving and sending operations performed by the first communication apparatus in the foregoing method 800. The processor 1402 is configured to perform an operation other than the receiving and sending operations performed by the first communication apparatus in the foregoing method 800. For example, the communication interface 1401 is configured to obtain application information and at least one piece of verification information; and the processor 1402 is configured to verify integrity of the application information based on the at least one piece of verification information.

In an example, the communication apparatus 1400 may perform the method 900 in the foregoing embodiment. When the communication apparatus 1400 is configured to perform the method 900 in the foregoing embodiment, the communication apparatus 1400 is equivalent to the second communication apparatus in the method 900. The communication interface 1401 is configured to perform receiving and sending operations performed by the second communication apparatus in the foregoing method 900. The processor 1402 is configured to perform an operation other than the receiving and sending operations performed by the second communication apparatus in the foregoing method 900. For example, the processor 1402 is configured to obtain application information and at least one piece of verification information, where the at least one piece of verification information is for verifying integrity of the application information; and the communication interface 1401 is configured to send the application information and the at least one piece of verification information to a first communication apparatus.

Figure 15:
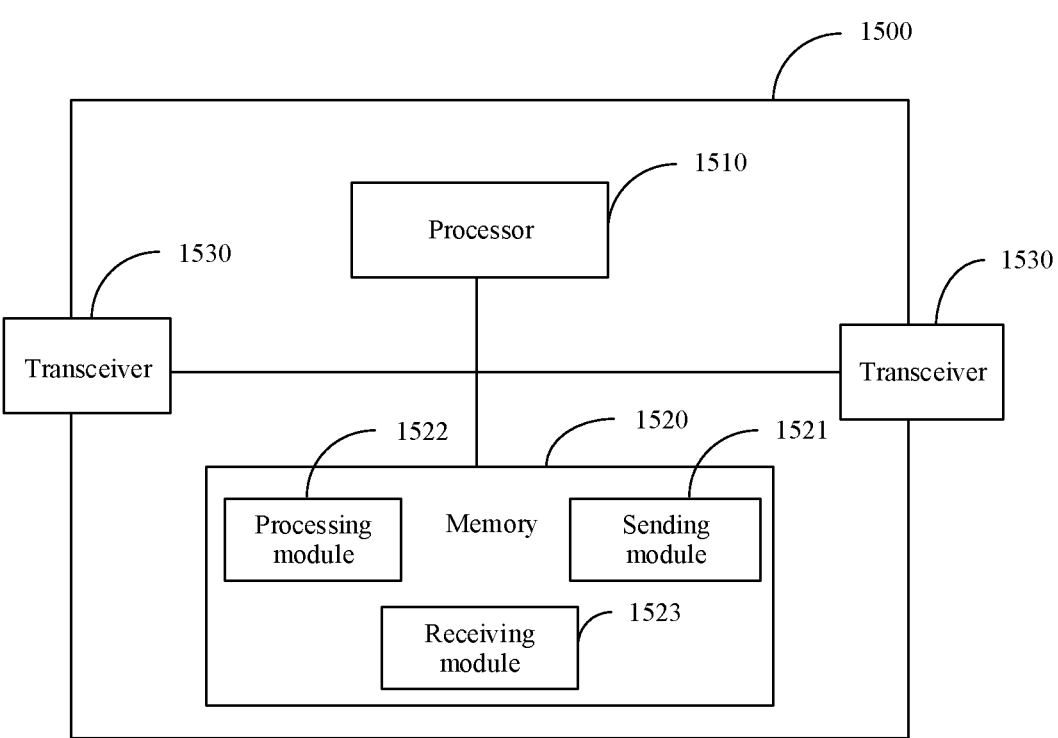
FIG. 15 is a schematic structural diagram of a communication apparatus according to an embodiment of the present disclosure.

In addition, an embodiment of the present disclosure further provides a communication apparatus 1500. FIG. 15 is a schematic structural diagram of a communication apparatus according to an embodiment of the present disclosure.

The communication apparatus 1500 may be configured to perform the method 100, the method 200, the method 300, the method 400, the method 500, the method 600, the method 700, the method 800, or the method 900 in the foregoing embodiment.

As shown in FIG. 15, the communication apparatus 1500 may include a processor 1510, a memory 1520 coupled to the processor 1510, and a transceiver 1530. The processor 1510 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1510 may be one processor or may include a plurality of processors. The memory 1520 may include a volatile memory, for example, a random-access memory (RAM); the memory may further include a non-volatile memory, for example, a read-only memory (ROM), a flash memory, a hard disk drive (HDD), or a solid-state drive (SSD). The memory 1520 may further include a combination of the foregoing memories. The memory 1520 may be one memory or may include a plurality of memories. In an implementation, the memory 1520 stores computer-readable instructions. The computer-readable instructions include a plurality of software modules, for example, a sending module 1521, a processing module 1522, and a receiving module 1523. After executing each software module, the processor 1510 may perform a corresponding operation as indicated by each software module. In this embodiment, an operation performed by a software module is the operation performed by the processor 1510 based on the indication of the software module.

In an example, the communication apparatus 1500 may perform the method 100 in the foregoing embodiment. When the communication apparatus 1500 is configured to perform the method 100 in the foregoing embodiment, the communication apparatus 1500 is equivalent to the communication apparatus 1 in the method 100. In this case, the processing module 1522 is configured to generate a packet 1, where the packet 1 includes application information 1 and verification information 1, and the verification information 1 is for verifying integrity of the application information 1; and the sending module 1521 is configured to send the packet 1 to a communication apparatus 2.

In an example, the communication apparatus 1500 may perform the method 100 in the foregoing embodiment. When the communication apparatus 1500 is configured to perform the method 100 in the foregoing embodiment, the communication apparatus 1500 is equivalent to the communication apparatus 2 in the method 100. In this case, the receiving module 1523 is configured to receive a packet 1, where the packet 1 includes application information 1 and verification information 1. The processing module 1522 is configured to verify integrity of the application information 1 based on the verification information 1. In an example, the sending module 1521 is configured to forward the packet 1 when the application information 1 passes the verification.

In an example, the communication apparatus 1500 may perform the method 200 in the foregoing embodiment. When the communication apparatus 1500 is configured to perform the method 200 in the foregoing embodiment, the communication apparatus 1500 is equivalent to the communication apparatus 1 in the method 200. In this case, the processing module 1522 is configured to generate a packet 1, where the packet 1 includes a digital certificate 1, the digital certificate 1 includes application information 1 and verification information 1, and the verification information 1 is for verifying integrity of the application information 1; and the sending module 1521 is configured to send the packet 1 to a communication apparatus 2.

In an example, the communication apparatus 1500 may perform the method 200 in the foregoing embodiment. When the communication apparatus 1500 is configured to perform the method 200 in the foregoing embodiment, the communication apparatus 1500 is equivalent to the communication apparatus 2 in the method 200. In this case, the receiving module 1523 is configured to receive a packet 1, where the packet 1 includes a digital certificate 1, and the digital certificate 1 includes application information 1 and verification information 1. The processing module 1522 is configured to verify validity of the digital certificate 1. In an example, the sending module 1521 is configured to forward the packet 1 when the application information 1 passes verification.

In an example, the communication apparatus 1500 may perform the method 300 in the foregoing embodiment. When the communication apparatus 1500 is configured to perform the method 300 in the foregoing embodiment, the communication apparatus 1500 is equivalent to the first communication apparatus in the method 300. In this case, the receiving module 1523 is configured to receive a first packet, where the first packet includes application information and first verification information. The processing module 1522 is configured to verify integrity of the application information in the first packet based on the first verification information in the first packet. In an example, the sending module 1521 is configured to forward the first packet when the application information passes the verification.

In an example, the communication apparatus 1500 may perform the method 400 in the foregoing embodiment. When the communication apparatus 1500 is configured to perform the method 400 in the foregoing embodiment, the communication apparatus 1500 is equivalent to the second communication apparatus in the method 400. In this case, the processing module 1522 is configured to generate a first packet, where the first packet includes application information and first verification information, and the first verification information is for verifying integrity of the application information. The sending module 1521 is configured to send the first packet to the first communication apparatus.

In an example, the communication apparatus 1500 may perform the method 500 in the foregoing embodiment. When the communication apparatus 1500 is configured to perform the method 500 in the foregoing embodiment, the communication apparatus 1500 is equivalent to the first communication apparatus in the method 500. In this case, the receiving module 1523 is configured to obtain a first packet, where the first packet includes a digital certificate, the digital certificate includes application information and first verification information, and the first verification information is for verifying integrity of the application information. The processing module 1522 is configured to verify validity of the digital certificate. In an example, the sending module 1521 is configured to forward the first packet when the application information passes the verification.

In an example, the communication apparatus 1500 may perform the method 600 in the foregoing embodiment. When the communication apparatus 1500 is configured to perform the method 600 in the foregoing embodiment, the communication apparatus 1500 is equivalent to the second communication apparatus in the method 600. In this case, the processing module 1522 is configured to obtain a first packet, where the first packet includes a digital certificate, the digital certificate includes application information and first verification information, and the first verification information is for verifying integrity of the application information. The sending module 1521 is configured to send the first packet to the first communication apparatus.

In an example, the communication apparatus 1500 may perform the method 700 in the foregoing embodiment. When the communication apparatus 1500 is configured to perform the method 700 in the foregoing embodiment, the communication apparatus 1500 is equivalent to the control management device in the method 700. In this case, the receiving module 1523 is configured to obtain application information, the processing module 1522 is configured to obtain first verification information based on the application information, where the first verification information is for verifying integrity of the application information, and the sending module 1521 is further configured to send the first verification information to a second communication apparatus.

In an example, the communication apparatus 1500 may perform the method 800 in the foregoing embodiment. When the communication apparatus 1500 is configured to perform the method 800 in the foregoing embodiment, the communication apparatus 1500 is equivalent to the first communication apparatus in the method 800. In this case, the receiving module 1523 is configured to obtain application information and at least one piece of verification information, where the at least one piece of verification information is for verifying integrity of the application information. The processing module 1522 is configured to verify the integrity of the application information based on the at least one piece of verification information.

In an example, the communication apparatus 1500 may perform the method 900 in the foregoing embodiment. When the communication apparatus 1500 is configured to perform the method 900 in the foregoing embodiment, the communication apparatus 1500 is equivalent to the second communication apparatus in the method 900. In this case, the processing module 1522 is configured to obtain application information and at least one piece of verification information, where the at least one piece of verification information is for verifying integrity of the application information. The sending module 1521 is configured to send the application information and the at least one piece of verification information to a first communication apparatus.

In addition, after executing the computer-readable instructions in the memory 1520, the processor 1510 may perform, as indicated by the computer-readable instructions, all operations that may be performed by the network apparatus 1500. For example, all operations that can be performed by the communication apparatus 1 in the method 100 may be performed. For example, all operations that can be performed by the communication apparatus 2 in the method 100 may be performed. For example, all operations that can be performed by the communication apparatus 1 in the method 200 may be performed. For example, all operations that can be performed by the communication apparatus 2 in the method 200 may be performed. For example, all operations that can be performed by the first communication apparatus in the method 300 may be performed. For another example, all operations that can be performed by the second communication apparatus in the method 400 may be performed. For another example, all operations that can be performed by the first communication apparatus in the method 500 may be performed. For another example, all operations that can be performed by the second communication apparatus in the method 600 may be performed. For another example, all operations that can be performed by the control management device in the method 700 may be performed. For still another example, all operations that can be performed by the first communication apparatus in the method 800 may be performed. For still another example, all operations that can be performed by the second communication apparatus in the method 900 may be performed.

The control management device mentioned in the foregoing descriptions of embodiments of the present disclosure may be, for example, a device on which network management software is run, or may be, for example, a controller. This not specifically limited in embodiments of the present disclosure. An embodiment of the present disclosure further provides a computer-readable storage medium. The computer-readable storage medium stores instructions, and when the instructions are run on a computer, the computer is enabled to perform the steps performed by the first communication apparatus in the foregoing embodiments.

An embodiment of the present disclosure further provides a computer-readable storage medium. The computer-readable storage medium stores instructions, and when the instructions are run on a computer, the computer is enabled to perform the steps performed by the second communication apparatus in the foregoing embodiments.

An embodiment of the present disclosure further provides a computer-readable storage medium. The computer-readable storage medium stores instructions, and when the instructions are run on a computer, the computer is enabled to perform the steps performed by the control management device in the foregoing embodiments.

An embodiment of the present disclosure further provides a communication system, including the first communication apparatus and the second communication apparatus mentioned in the foregoing embodiments.

An embodiment of the present disclosure further provides a communication system, including the second communication apparatus and the control management device mentioned in the foregoing embodiments.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have," and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of the present disclosure may be integrated into one processing unit, or each of the units may exist alone physically, or two or more units may be integrated into one unit. The integrated unit may be implemented in a form of hardware or may be implemented in a form of a software service unit.

When the integrated unit is implemented in a form of a software service unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of the present disclosure. The storage medium includes any medium that can store program code, such as a USB flash drive, a removable hard disk, a ROM, a RAM, a magnetic disk, or an optical disc.

Persons skilled in the art should be aware that in the foregoing one or more examples, services described in the present disclosure may be implemented by hardware, software, firmware, or any combination thereof. When being implemented by software, the foregoing services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of the present disclosure have been further described in detail in the foregoing specific implementations. It should be understood that the foregoing descriptions are merely specific implementations of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A method performed by an apparatus, the method comprising:
receiving a packet comprising application information and first verification information, wherein the packet is an Internet Protocol version 6 (IPv6) packet comprising an IPV6 extension header carrying the application information, wherein the application information includes one or more of the following: a service level agreement (SLA) level, an application identifier, a user identifier, or a flow identifier; and
verifying an integrity of the application information based on the first verification information, wherein verifying the integrity of the application information based on the first verification information comprises verifying the integrity of the application information based on a first verification method and the first verification information, wherein the first verification method uses a digital signature verification based on a digital signature, wherein the digital signature is based on signing a target field through a first private key and first hash calculation, and wherein verifying the integrity of the application information based on the first verification method and the first verification information comprises:
decrypting the digital signature using a first public key to obtain a first plaintext;
performing a second hash calculation on the target field to obtain a second plaintext, wherein the first hash calculation and the second hash calculation use a same hash algorithm; and
performing a second matching verification on the first plaintext and the second plaintext.

2. The method of claim 1, further comprising forwarding the packet when the integrity of the application information is verified.

3. The method of claim 1, wherein verifying the integrity of the application information based on the first verification information comprises:
obtaining second verification information based on a target field in the packet, wherein the target field comprises the application information; and
performing matching verification on the second verification information and the first verification information.

4. The method of claim 1, wherein the first verification method is keyed-hash message authentication code (HMAC) verification.

5. A method performed by a first communication apparatus, the method comprising:
generating a packet, wherein the packet comprises application information and first verification information, wherein the packet is an Internet Protocol version 6 (IPv6) packet comprising an IPV6 extension header carrying the application information, wherein the application information includes one or more of the following: a service level agreement (SLA) level, an application identifier, a user identifier, or a flow identifier, wherein the first verification information is for verifying an integrity of the application information, wherein the first verification information is based on a calculation on a target field using a first verification method, wherein the first verification method is internet protocol security (IPsec-based) integrity verification, and wherein the first verification information is one of first authentication header (AH) verification information or first encapsulating security payload (ESP) verification information; and
sending the packet to a second communication apparatus.

6. The method of claim 5, wherein the first verification information is an encrypted digest in a digital certificate, and wherein the digital certificate comprises the application information.

7. The method of claim 5, wherein the first verification information is based on a target field in the packet, and the target field comprises the application information.

8. The method of claim 5, wherein the first verification method uses keyed-hash message authentication code (HMAC) verification.

9. The method of claim 5, wherein the first verification method uses a digital signature verification based on a digital signature.

10. The method of claim 9, wherein the digital signature is based on signing the target field through a first private key and first hash calculation.

11. The method of claim 8, further comprising receiving the first verification information from a control management device.

12. An apparatus comprising:

a memory configured to store instructions; and a processor coupled to the memory and configured to execute the instructions to cause the apparatus to:

receive a packet, wherein the packet comprises application information and first verification information, wherein the packet is an Internet Protocol version 6 (IPv6) packet comprising an IPV6 extension header carrying the application information, wherein the application information includes one or more of the following: a service level agreement (SLA) level, an application identifier, a user identifier, or a flow identifier, and wherein the first verification information is for verifying integrity of the application information; and verify the integrity of the application information based on the first verification information, wherein verifying the integrity of the application information based on the first verification information comprises verifying the integrity of the application information based on a first verification method and the first verification information, wherein the first verification method uses a digital signature verification based on a digital signature, wherein the digital signature is based on signing a target field through a first private key and first hash calculation, and wherein verifying the integrity of the application information based on the first verification method and the first verification information comprises:

decrypting the digital signature using a first public key to obtain a first plaintext;

performing a second hash calculation on the target field to obtain a second plaintext, wherein the first hash calculation and the second hash calculation use a same hash algorithm; and performing a second matching verification on the first plaintext and the second plaintext.

13. The apparatus of claim 12, wherein the processor is further configured to execute the instructions to cause the apparatus to:

obtain second verification information based on a target field in the packet, wherein the target field comprises the application information; and perform matching verification on the second verification information and the first verification information.

\* \* \* \* \*